United States Patent [19]

Smith et al.

[11] Patent Number: 4,561,075
[45] Date of Patent: Dec. 24, 1985

[54] METHOD AND APPARATUS FOR SELECTING INVERSE POWER WEIGHTING PRIOR TO VERTICALLY STACKING ACQUIRED SEISMIC DATA FOR SUPPRESSING NOISE

[75] Inventors: James W. Smith, Houston, Tex.; Jerry W. Ehlers, Tulsa, Okla.

[73] Assignee: Standard Oil Company, Chicago, Ill.

[21] Appl. No.: 454,403

[22] Filed: Dec. 29, 1982

[51] Int. Cl.$^4$ .............................................. G01V 1/00
[52] U.S. Cl. ....................................... 367/46; 367/62; 367/63; 364/421
[58] Field of Search ....................... 367/22, 37, 38, 39, 367/46, 62, 63; 364/421, 422, 581, 582; 343/378, 383, 384

[56] References Cited

U.S. PATENT DOCUMENTS

| 2,688,124 | 8/1954 | Doty et al. ............................ 367/47 |
| 3,213,411 | 10/1965 | Loring ............................ 364/421 X |
| 3,275,980 | 9/1966 | Foster ............................ 364/422 X |
| 3,398,396 | 8/1968 | Embree ............................ 367/63 X |
| 3,413,473 | 11/1968 | Mills, Jr. ............................ 364/422 X |
| 3,689,874 | 9/1972 | Foster et al. ............................ 367/46 |
| 3,744,019 | 7/1973 | Schmitt ............................ 367/60 |
| 3,806,864 | 4/1974 | Broding et al. ............................ 367/77 X |
| 3,894,222 | 7/1975 | Siems ............................ 364/421 X |
| 3,946,357 | 3/1976 | Weinstein et al. ............................ 367/63 X |
| 4,218,766 | 8/1980 | Parrack et al. ............................ 364/421 X |
| 4,314,347 | 2/1982 | Stokely ............................ 364/421 X |
| 4,344,158 | 8/1982 | Landren, Jr. et al. ............................ 367/47 X |
| 4,397,006 | 8/1983 | Galbraith, Jr. ............................ 364/421 X |
| 4,468,761 | 8/1984 | Rietsch ............................ 367/21 X |

OTHER PUBLICATIONS

Robinson, John C., "Statistically Optional Stacking of Seismic Data" Geophysics, vol. 35, No. 3, Jun. 1970, pp. 437-446.

Sheriff, R. E., Encyclopedic Dictionary of Exploration Geophysics Society of Exploration Geophysicists, Tulsa, Okla., 1/23/75, pp. 60, 207.

Primary Examiner—Charles T. Jordan
Assistant Examiner—Brian S. Steinberger
Attorney, Agent, or Firm—Timothy D. Stanley

[57] ABSTRACT

A method and apparatus are disclosed for signal-to-noise optimization of seismic-trace signals during seismic prospecting utilizing plural initiations of a low energy surface seismic source. The method and apparatus optimize signal-to-noise ratio by vertically stacking, that is, summing, inverse power weighted seismic-trace signals from each of the plural initiations wherein the exponent used for weighting is selectable for optimizing the signal-to-noise ratio of the composite seismic-trace signal. The range of exponents provided is correlated to the range of ambient noise, including nonstationary noise, commonly encountered during seismic prospecting, especially vibroseis seismic prospecting, for the purpose of optimizing the quality of seismic-trace data.

23 Claims, 38 Drawing Figures

IPW SENSITIVITY TO POWER
(500 MS WINDOW, 15-FOLD STACK AND CROSS CORRELATION)

THEORETICAL SNR DEPENDENCY OF IPW WEIGHTS

OPTIMUM IPW EXPONENT VERSUS SNR

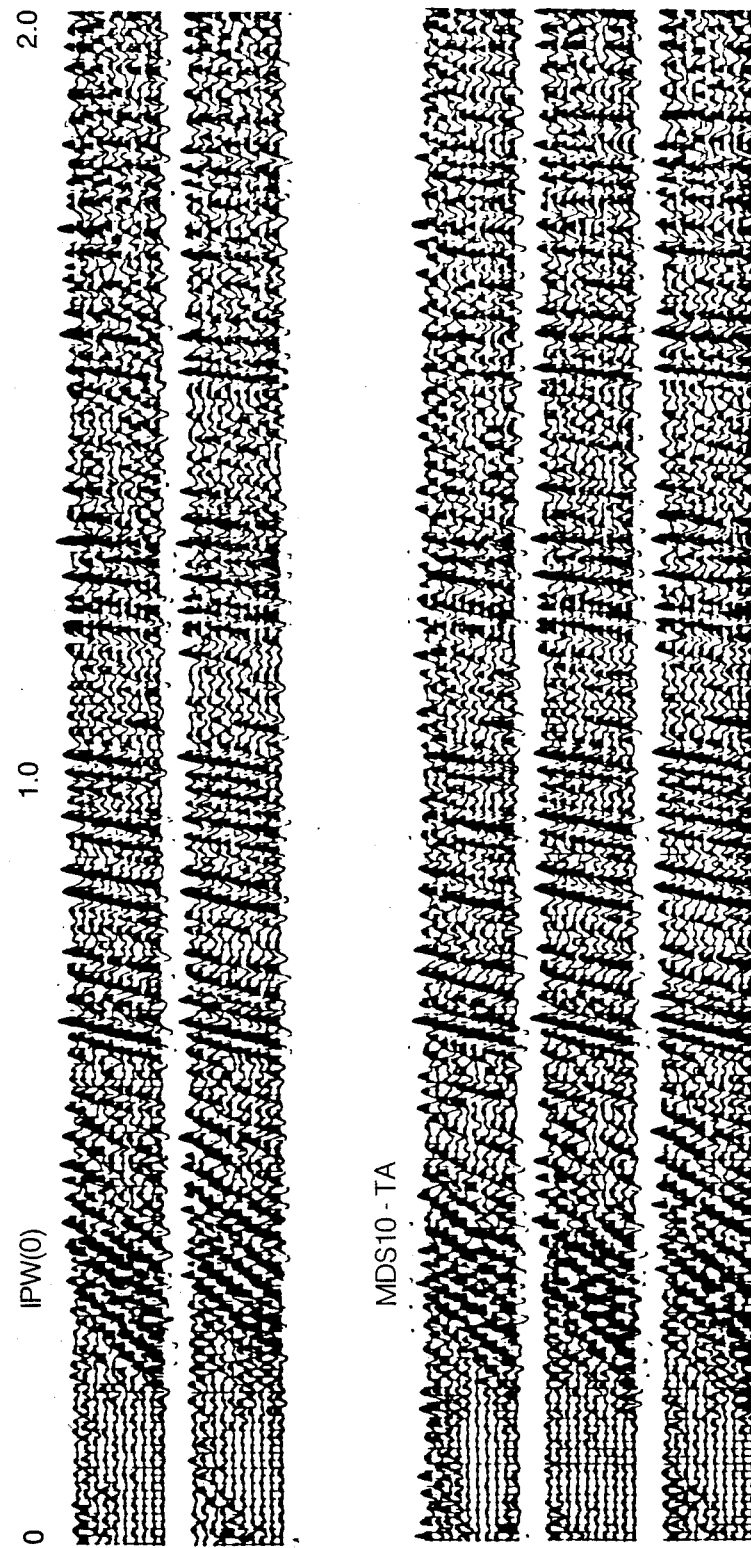

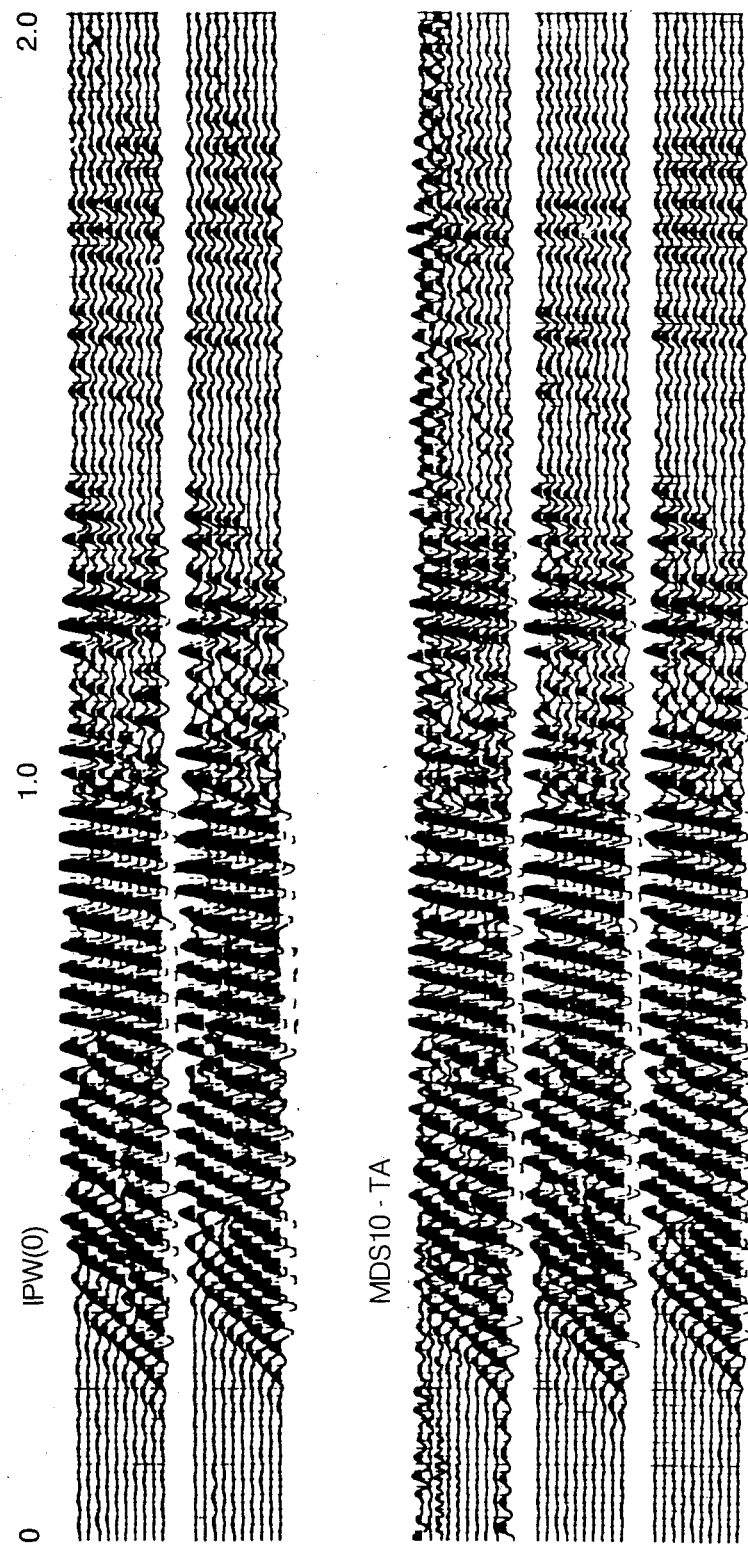
FIG. 4B  TEST 1 — QUIET/NEAR RANGE

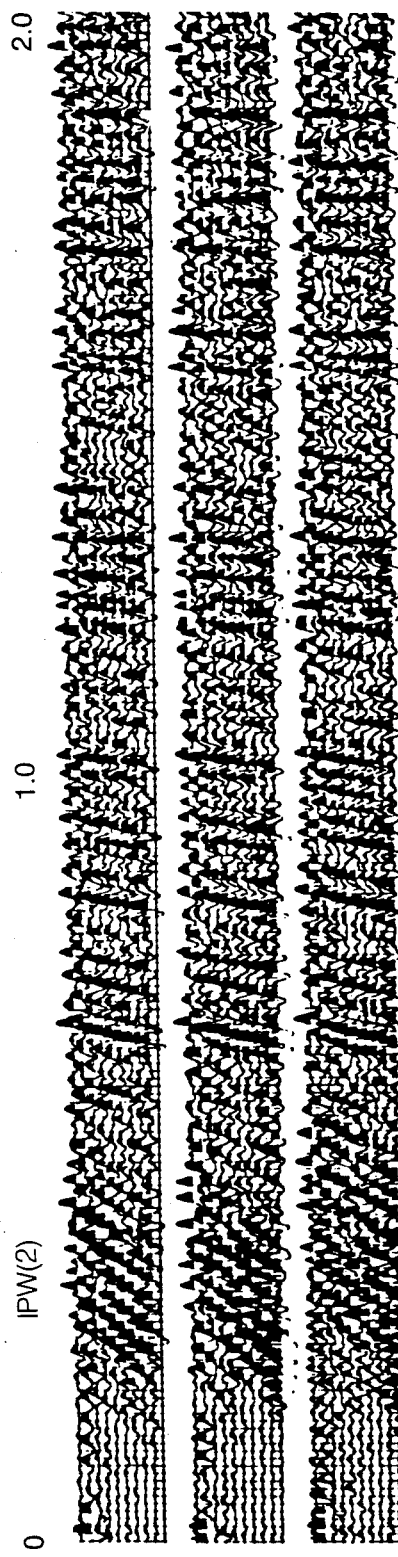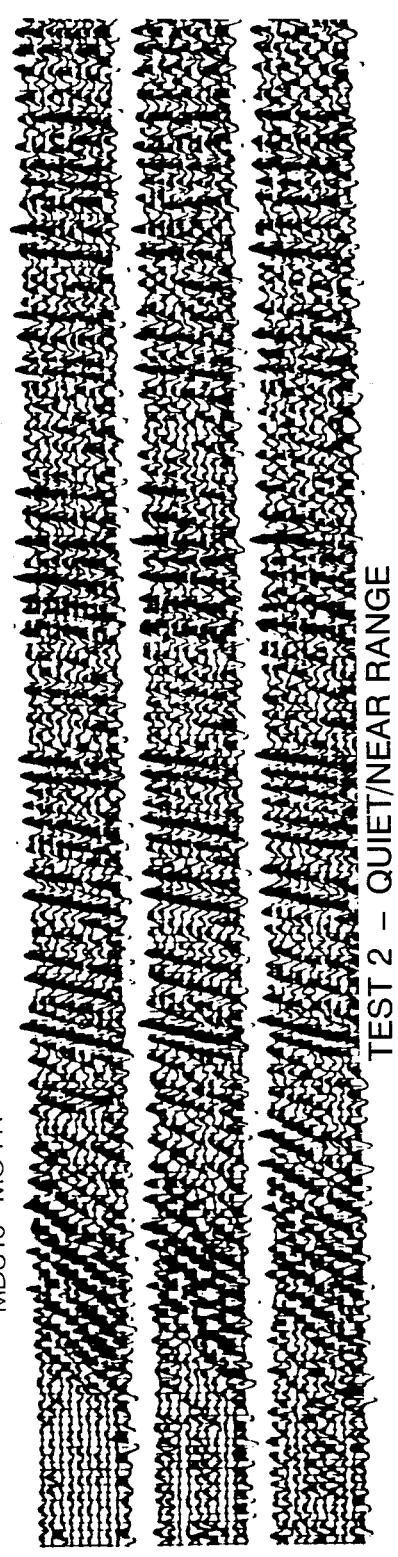
FIG. 5A TEST 2 – QUIET/NEAR RANGE

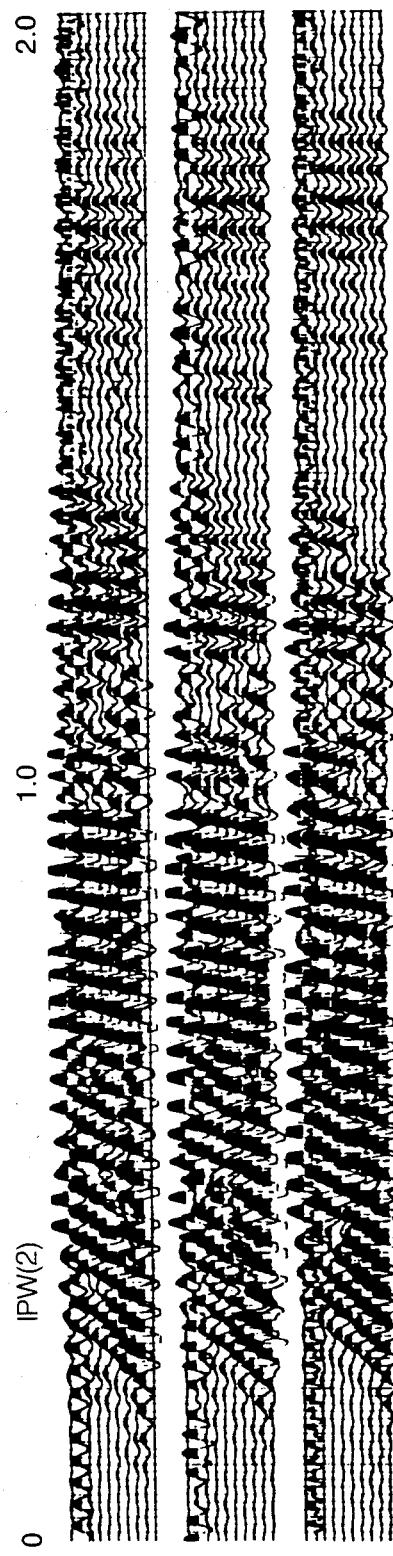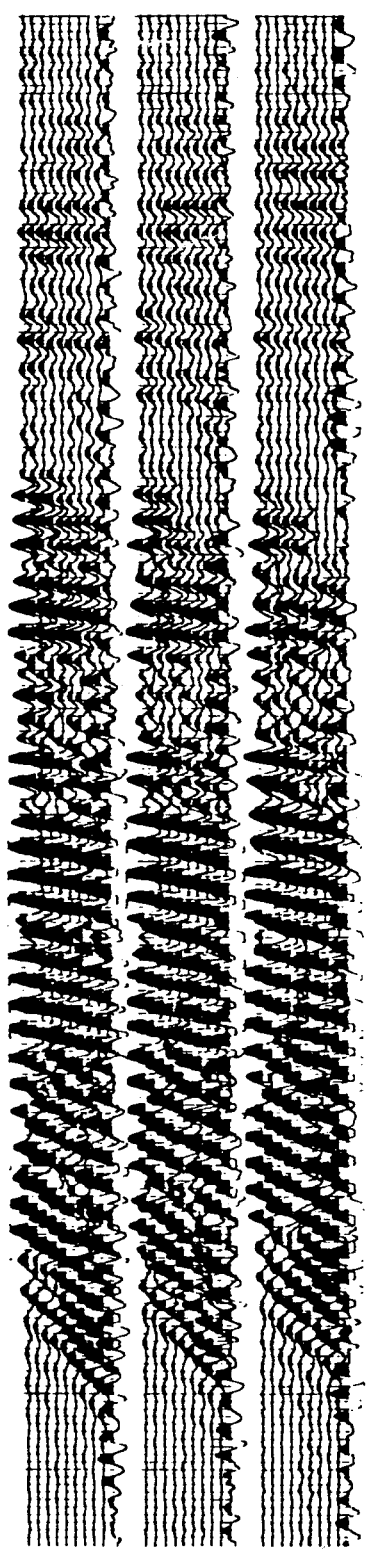
FIG. 5B  TEST 2 — QUIET/NEAR RANGE

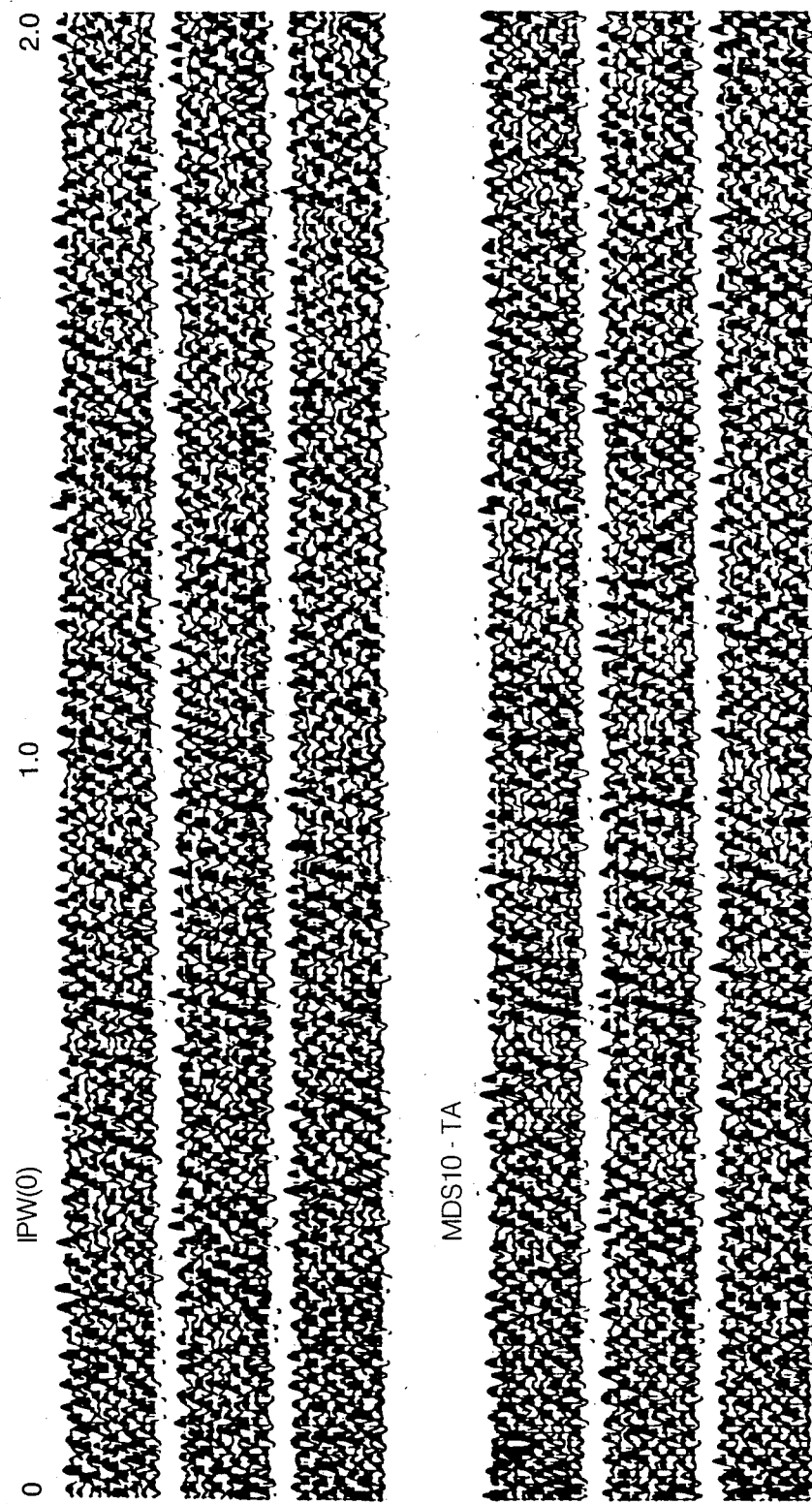
FIG. 6A TEST 3 – ROAD TRAFFIC/NEAR RANGE

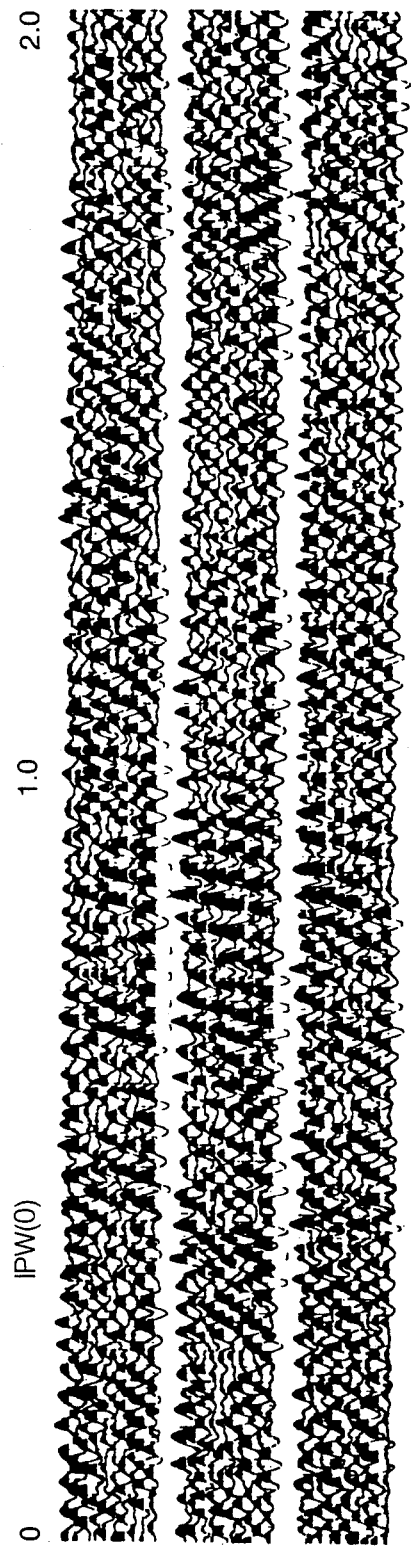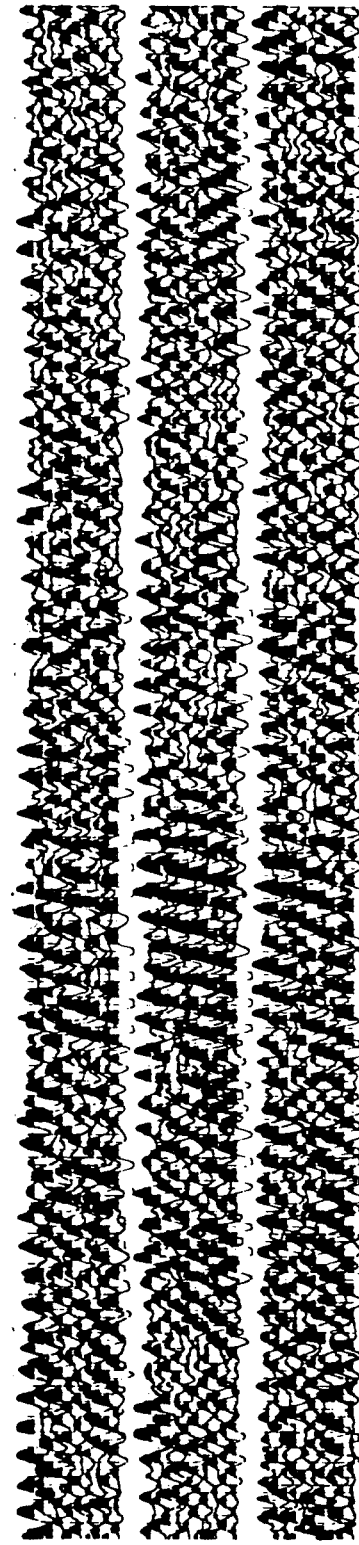
TEST 3 — ROAD TRAFFIC/NEAR RANGE
FIG.6B

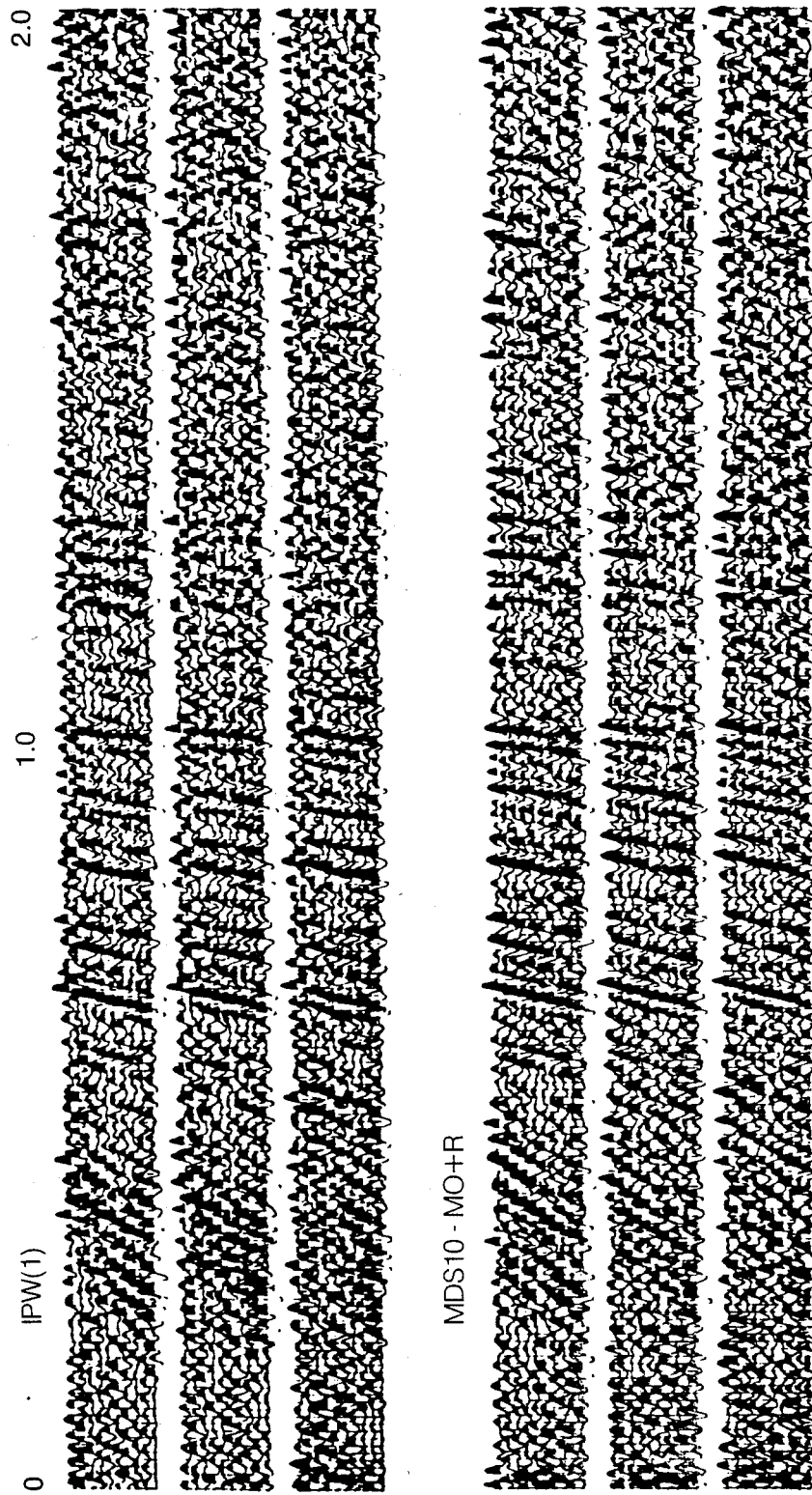
FIG.7A TEST 4 – ROAD NOISE/NEAR RANGE

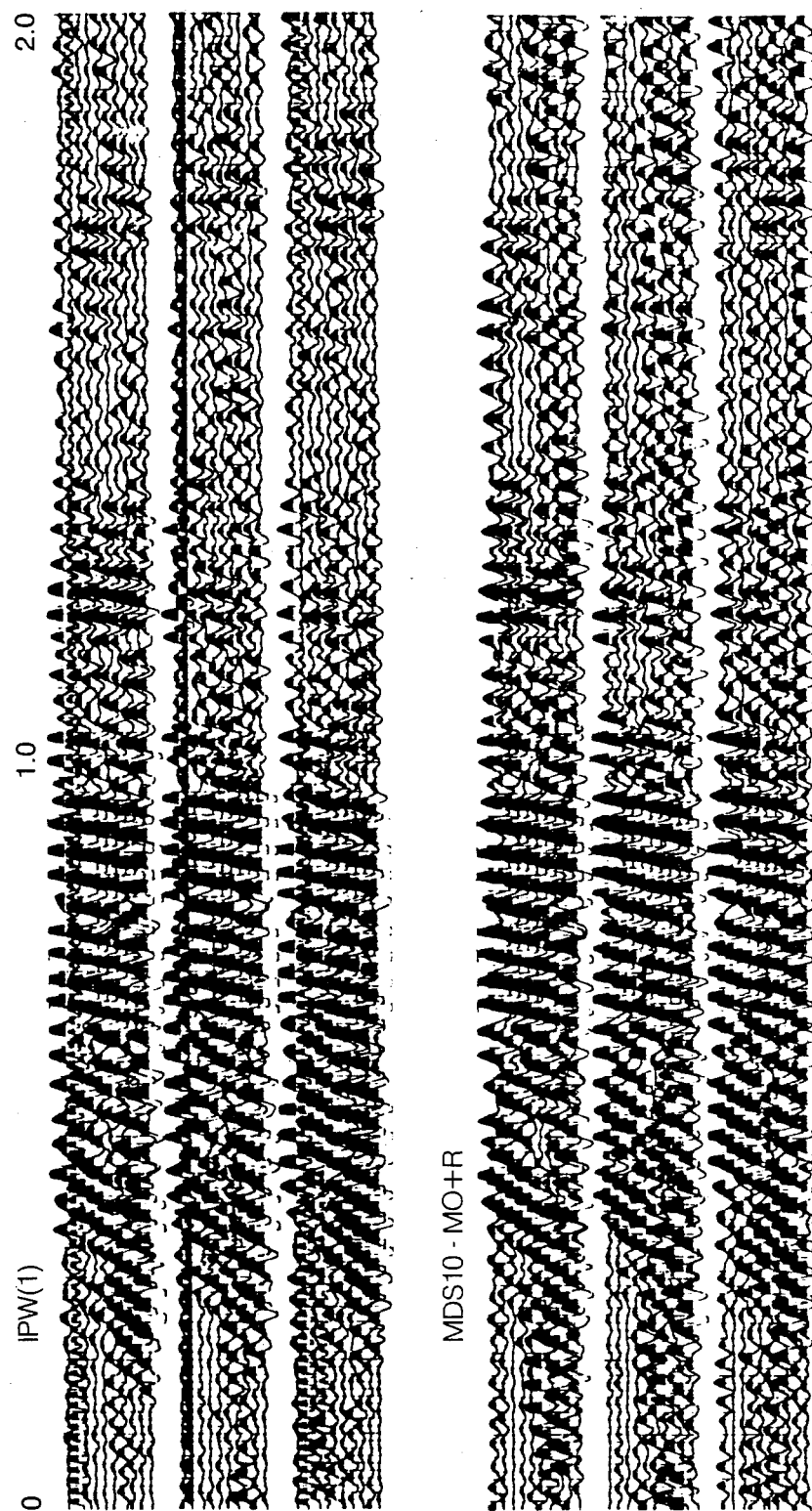
FIG.7B TEST 4 — ROAD NOISE/NEAR RANGE

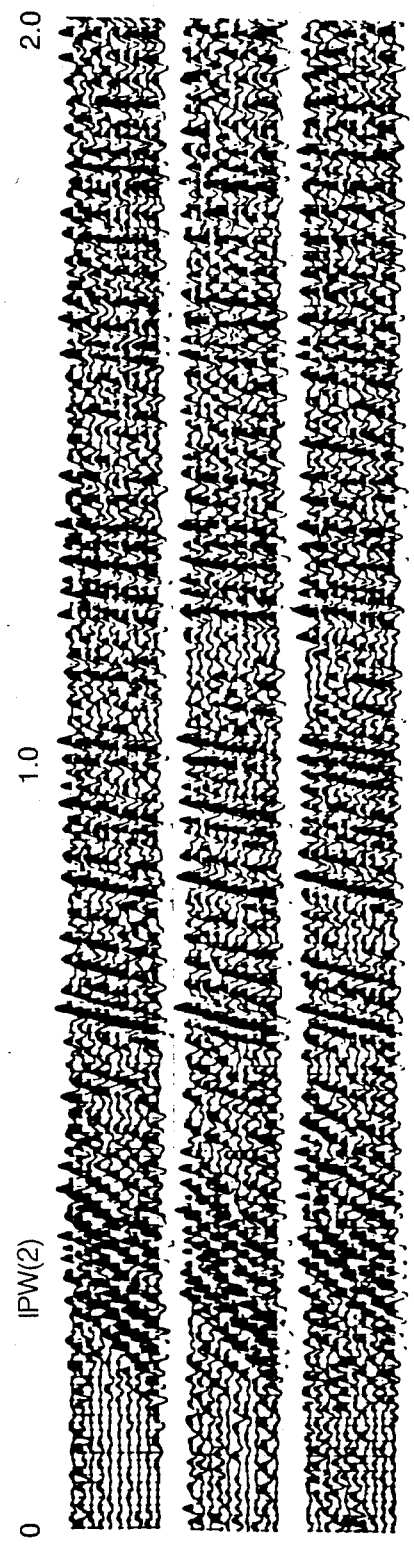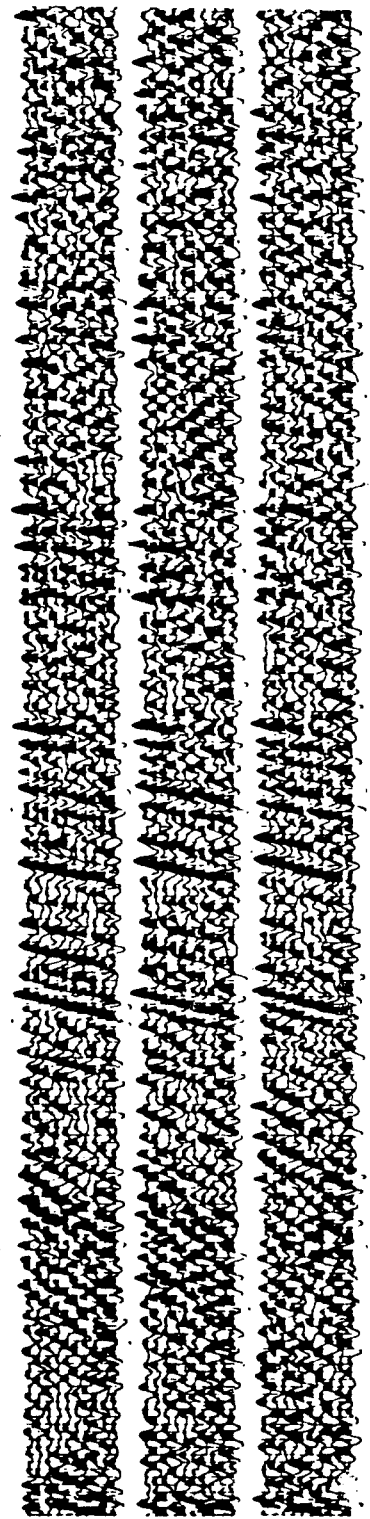
TEST 5 – ROAD TRAFFIC/NEAR RANGE
FIG.8A

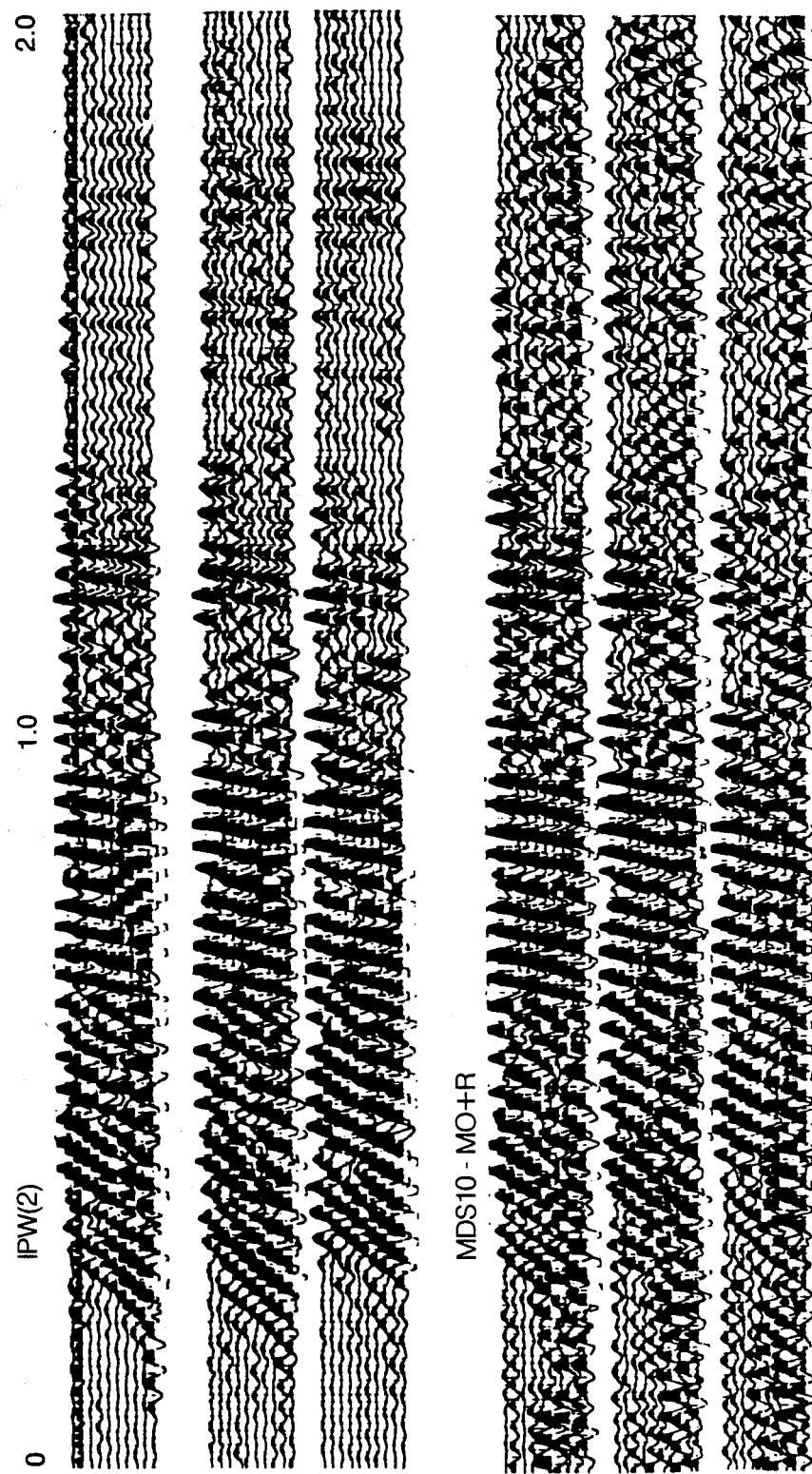
FIG. 8B  TEST 5 — ROAD TRAFFIC/NEAR RANGE

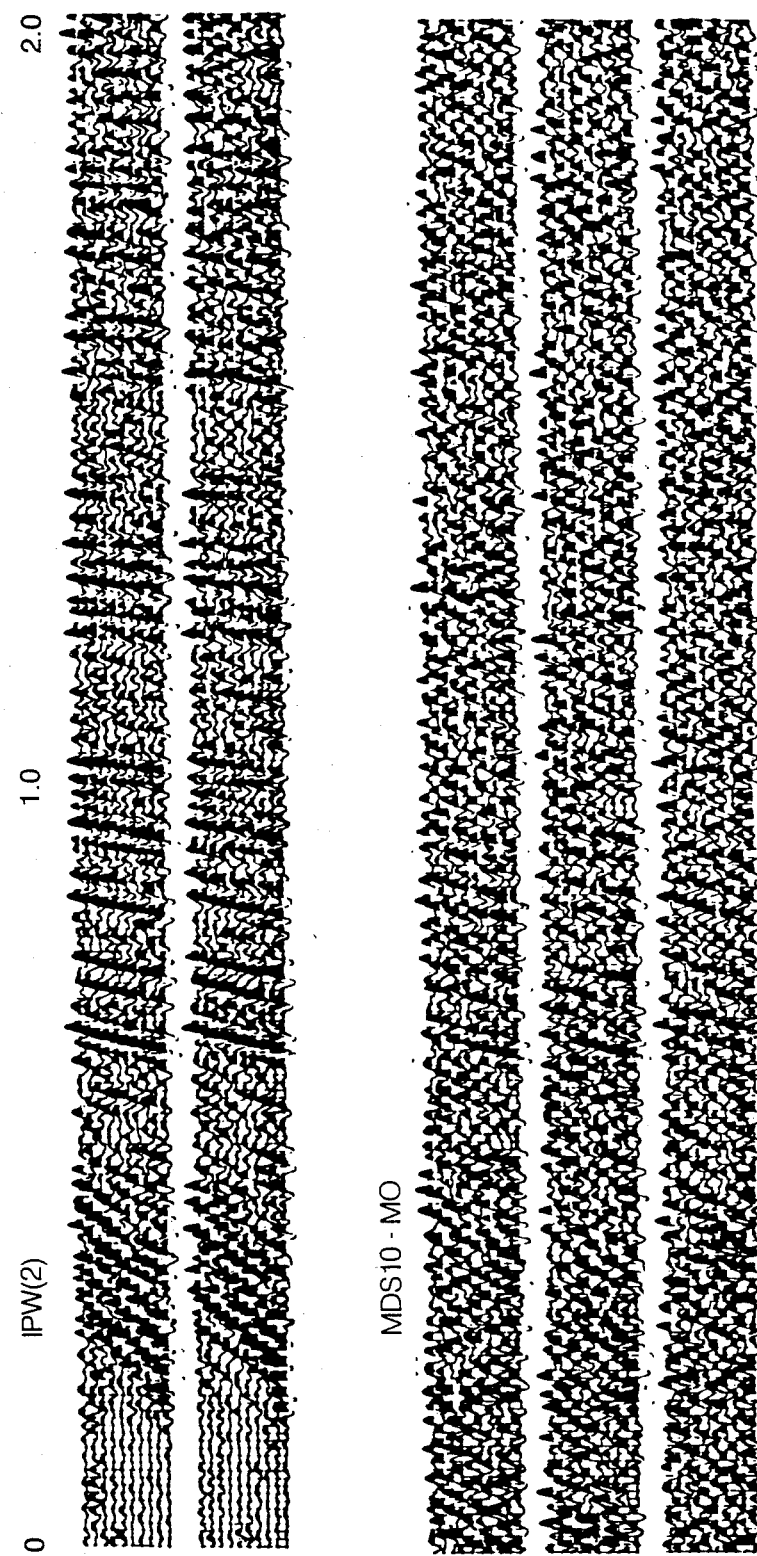
FIG. 9A TEST 6 – ROAD TRAFFIC/NEAR RANGE

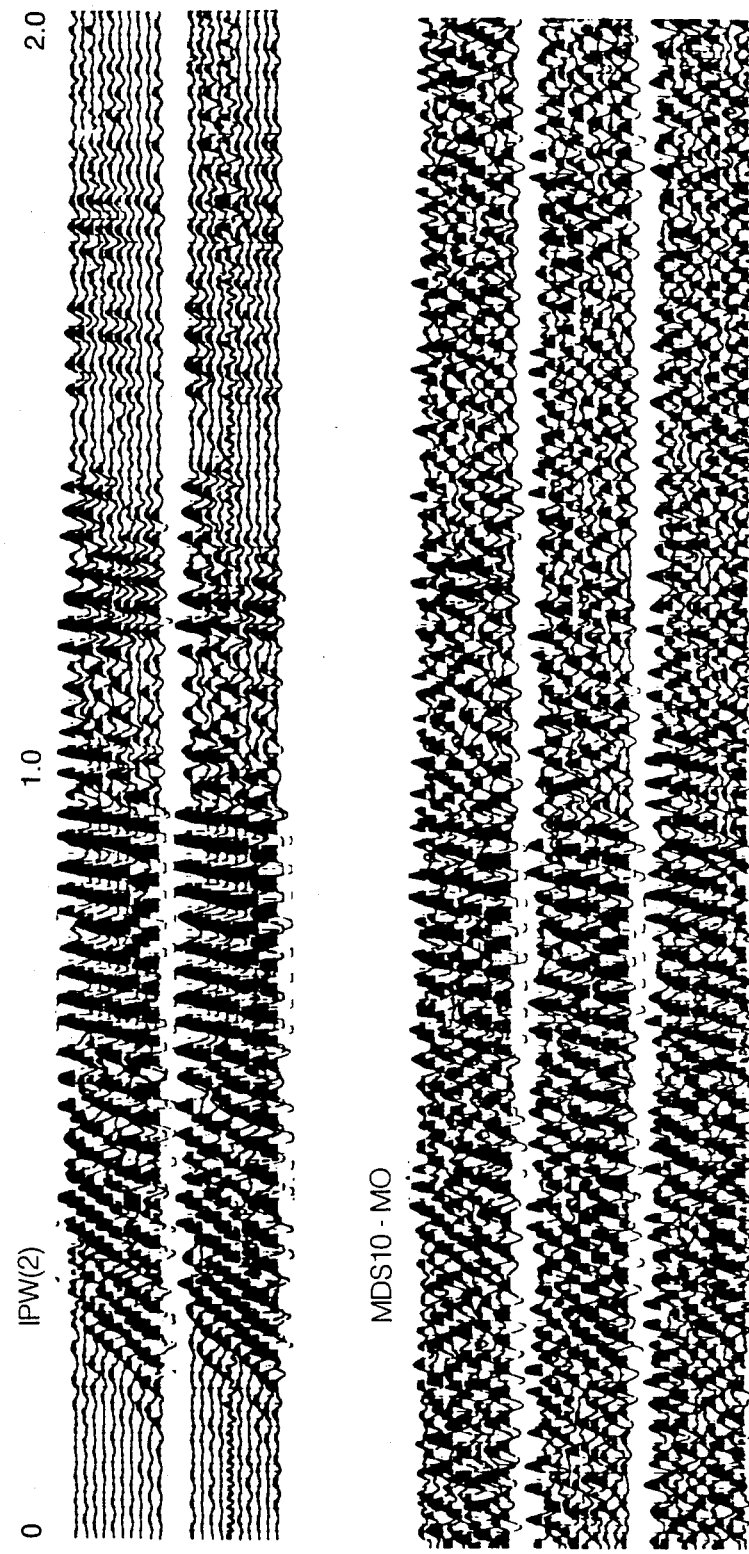
FIG.9B  TEST 6 — ROAD TRAFFIC/NEAR RANGE

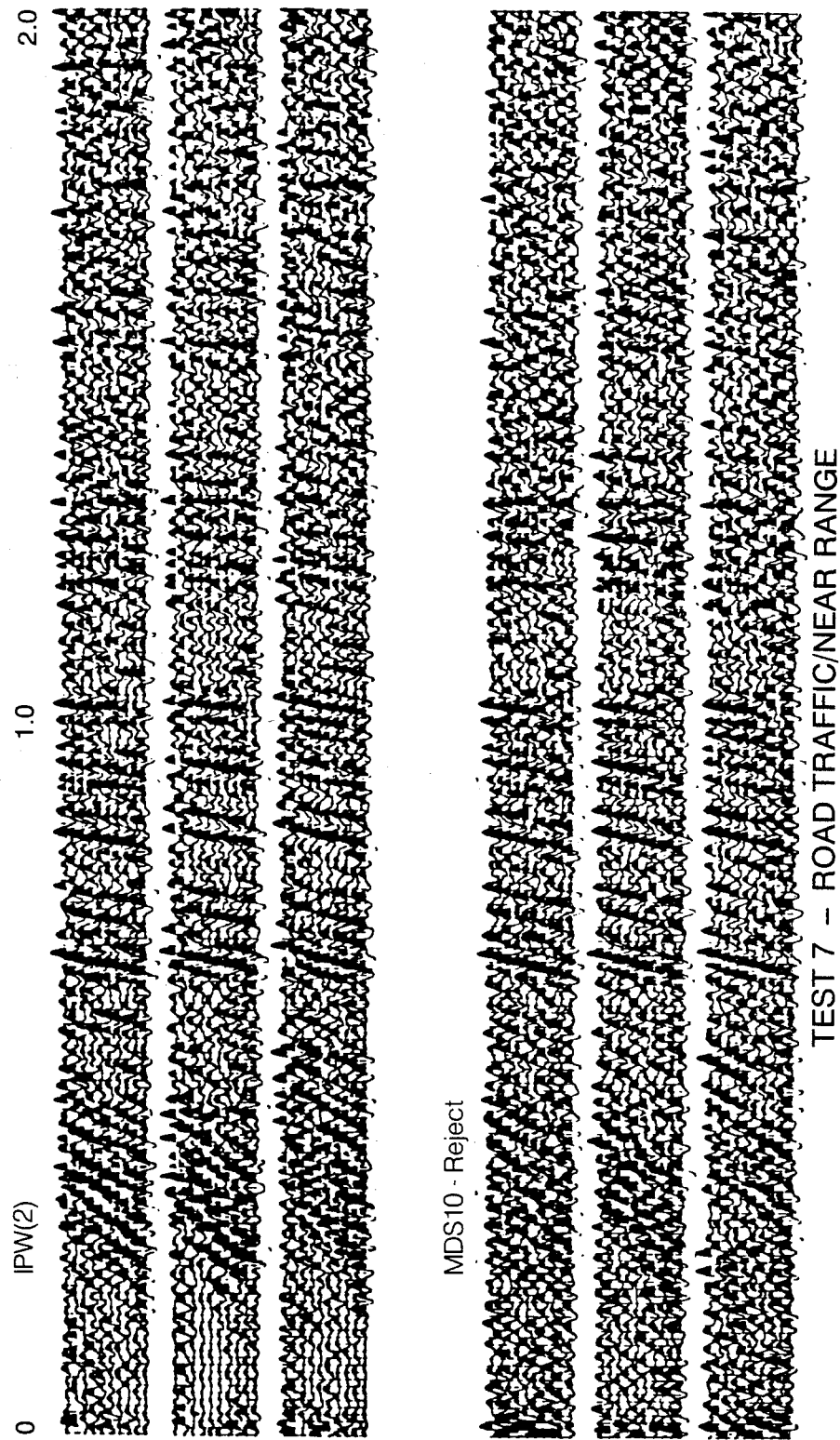
FIG. 10A TEST 7 – ROAD TRAFFIC/NEAR RANGE

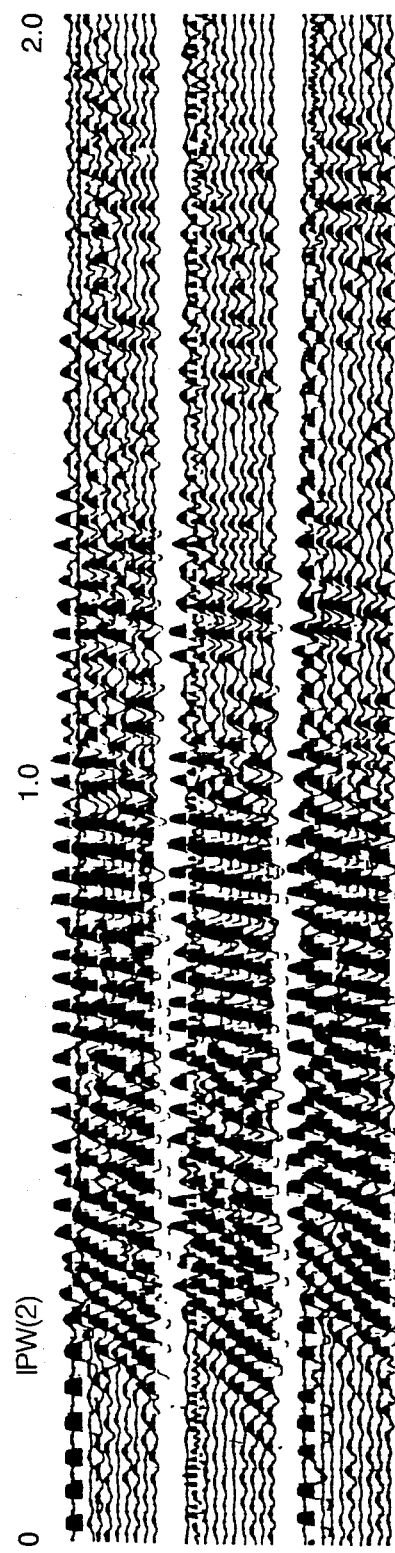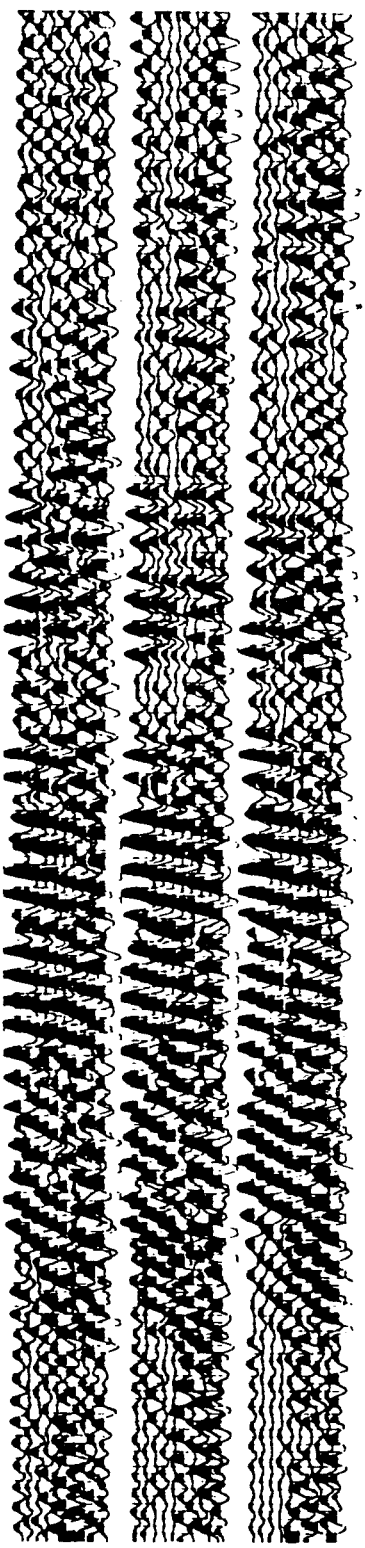
FIG.10B TEST 7 — ROAD TRAFFIC/NEAR RANGE

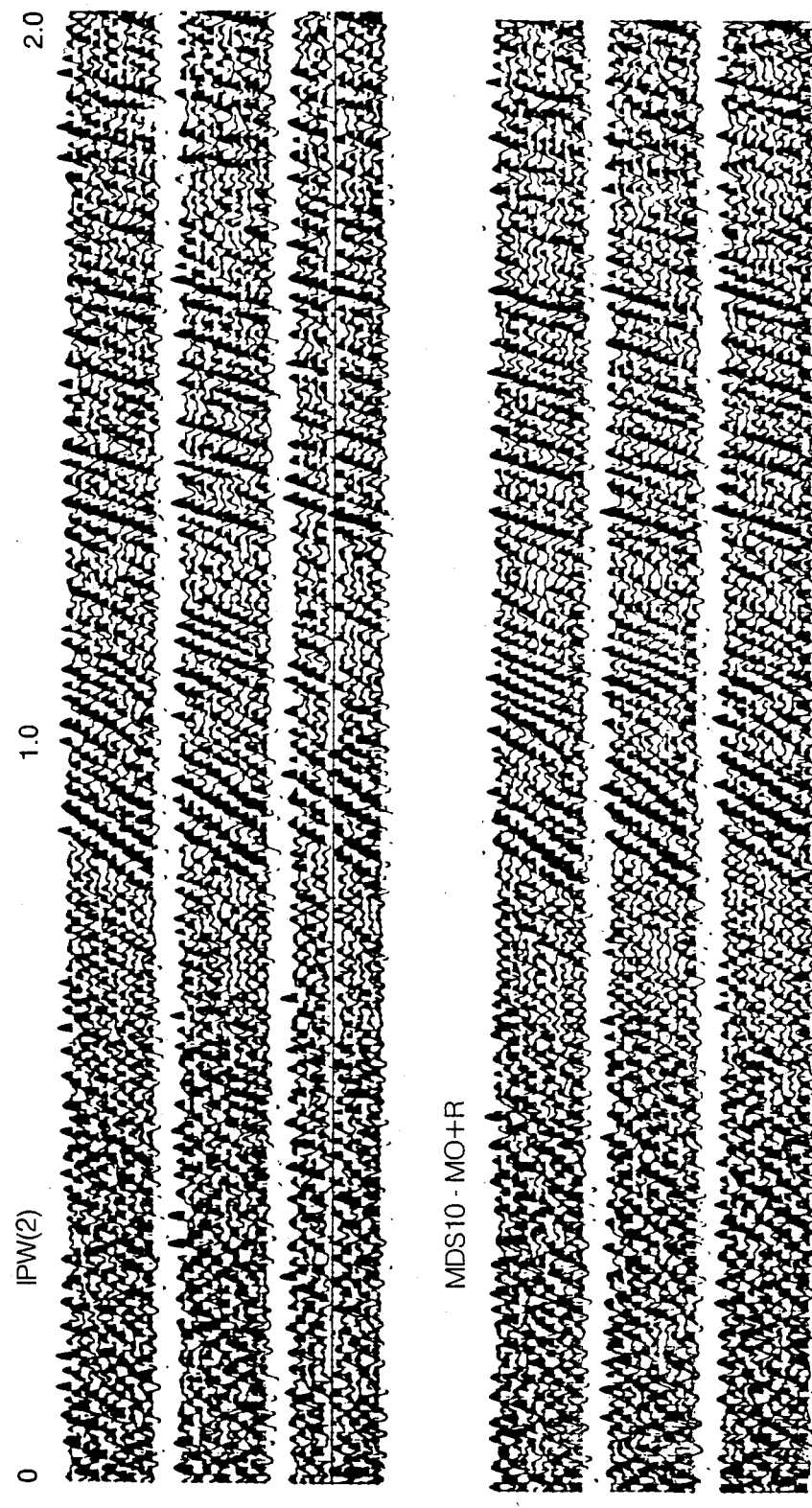
FIG.11A TEST 8 – QUIET/FAR RANGE

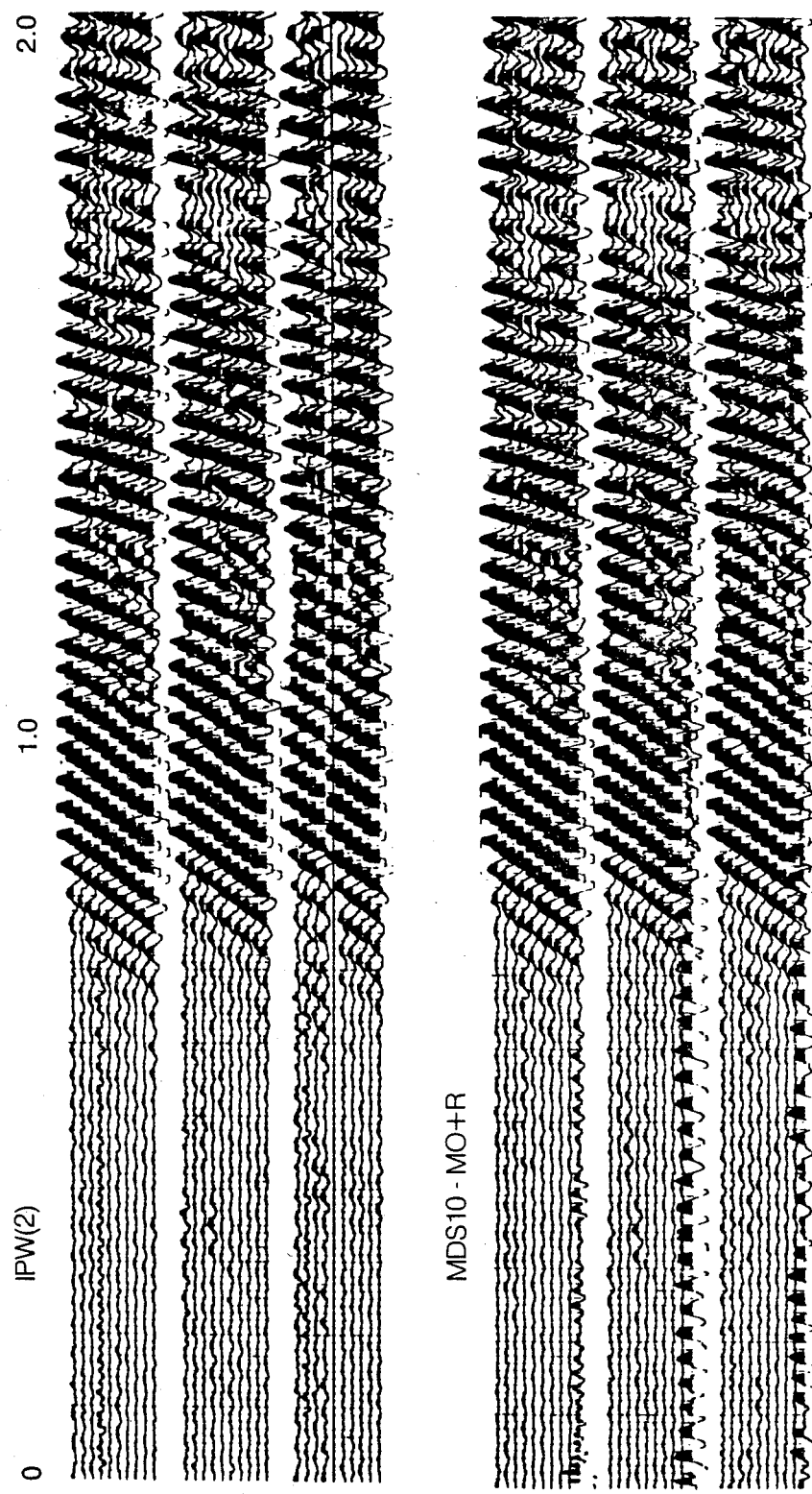
FIG. 11B TEST 8 - QUIET/FAR RANGE

TEST 9 – ROAD TRAFFIC/FAR RANGE

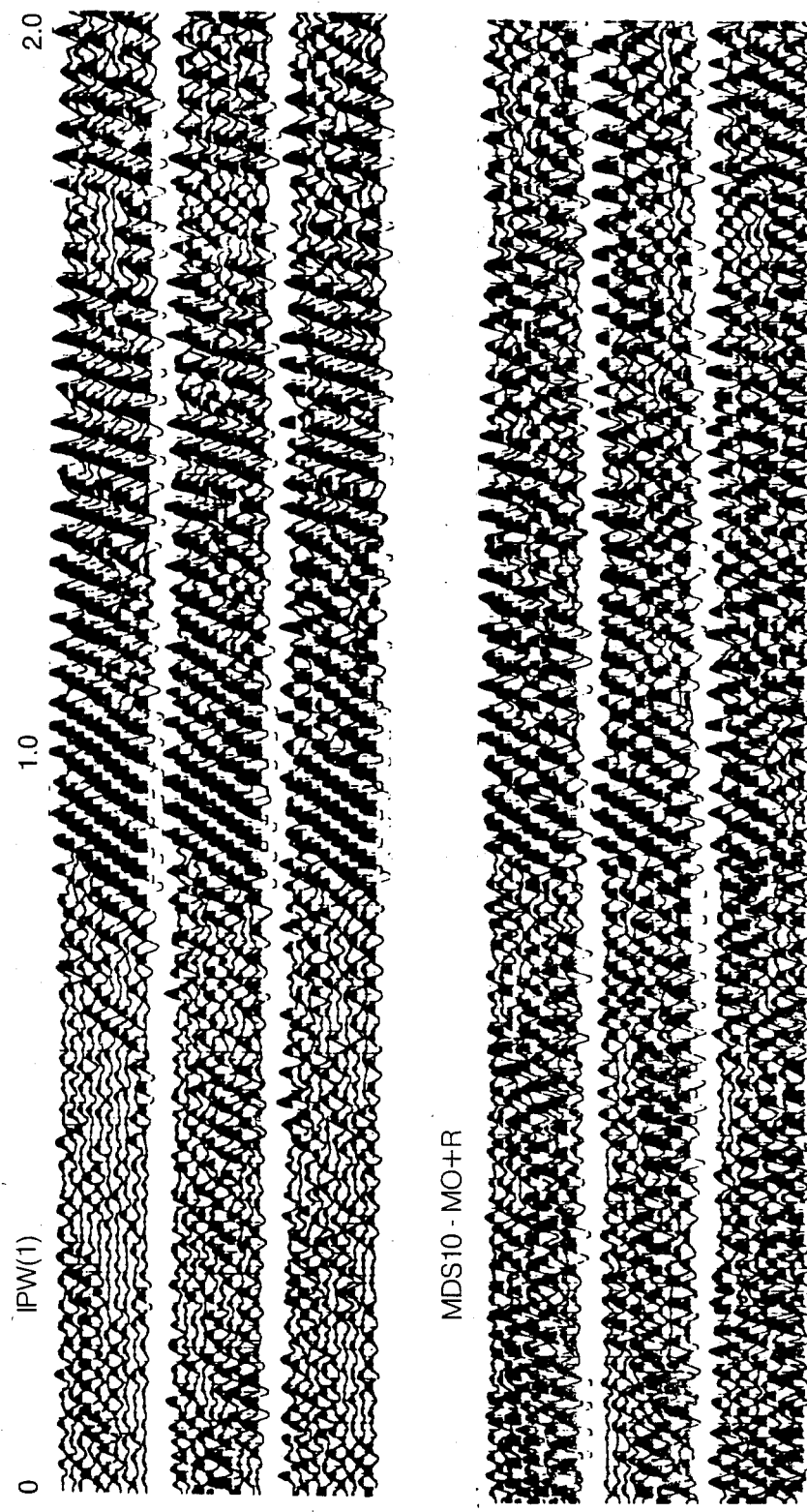
FIG.12B  TEST 9 — ROAD TRAFFIC/FAR RANGE

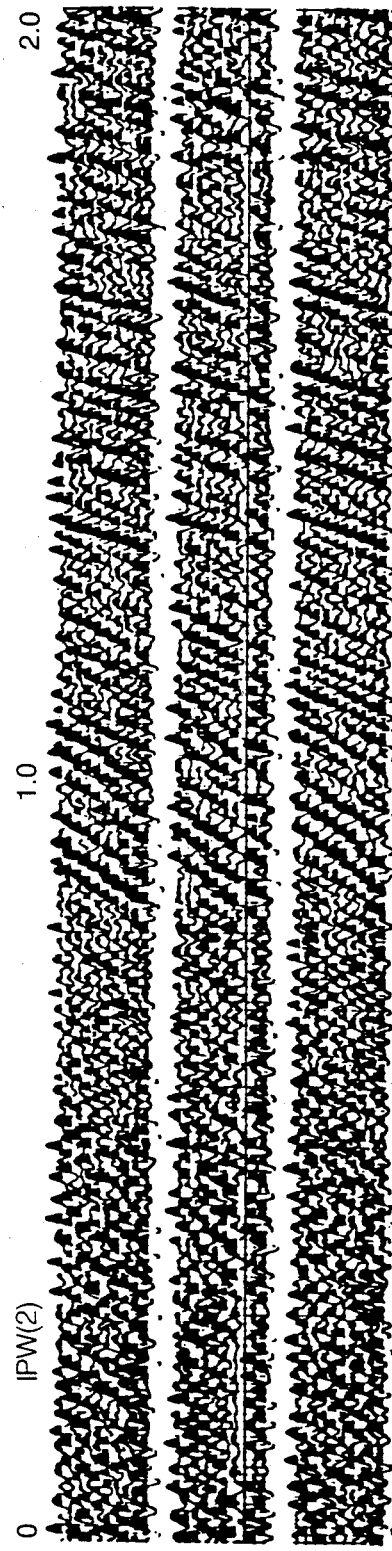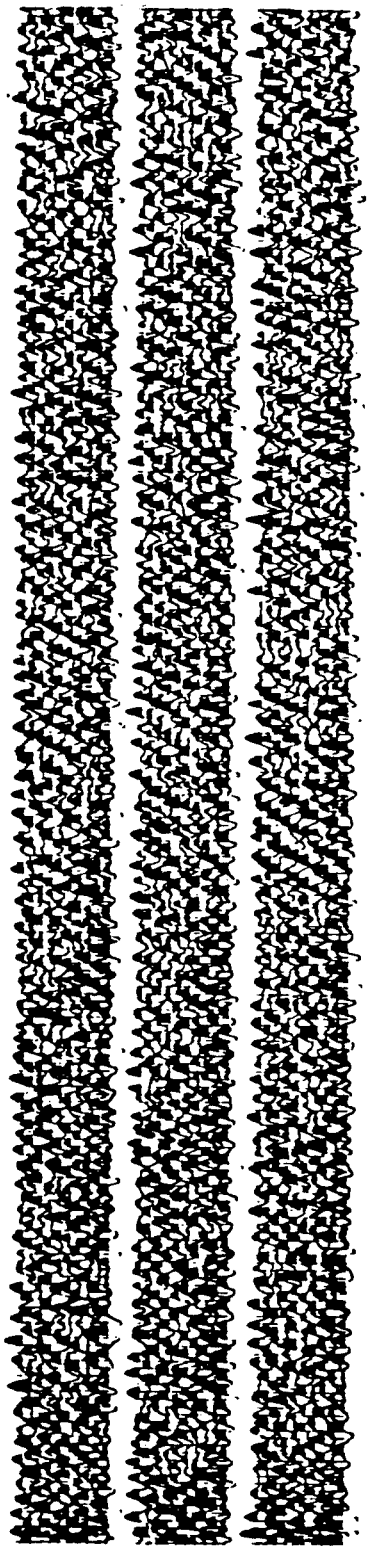
FIG.13A TEST 10 – ROAD TRAFFIC/FAR RANGE

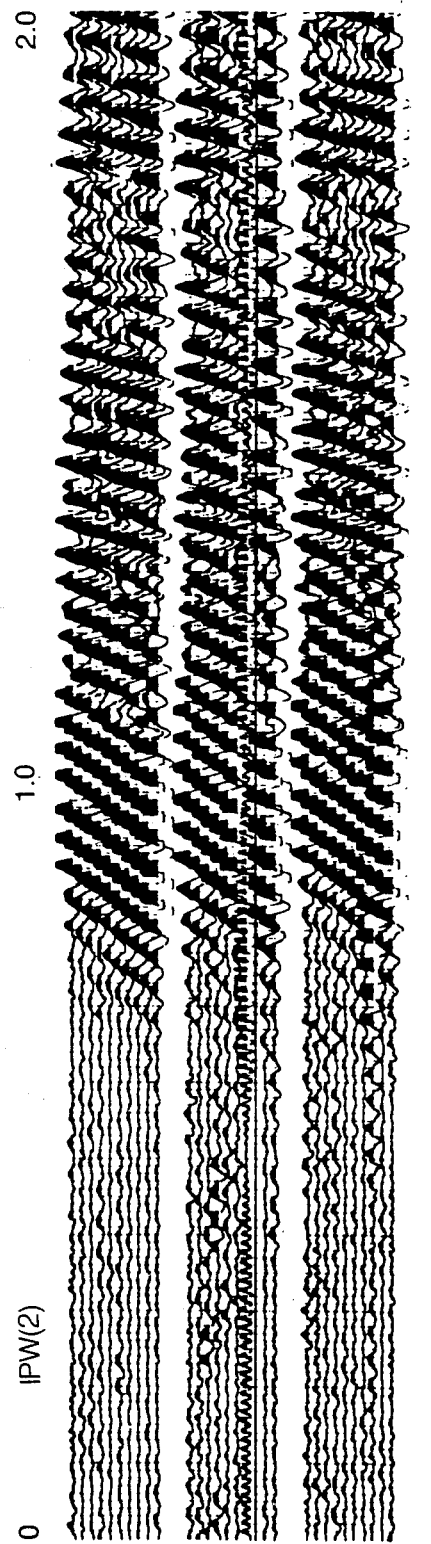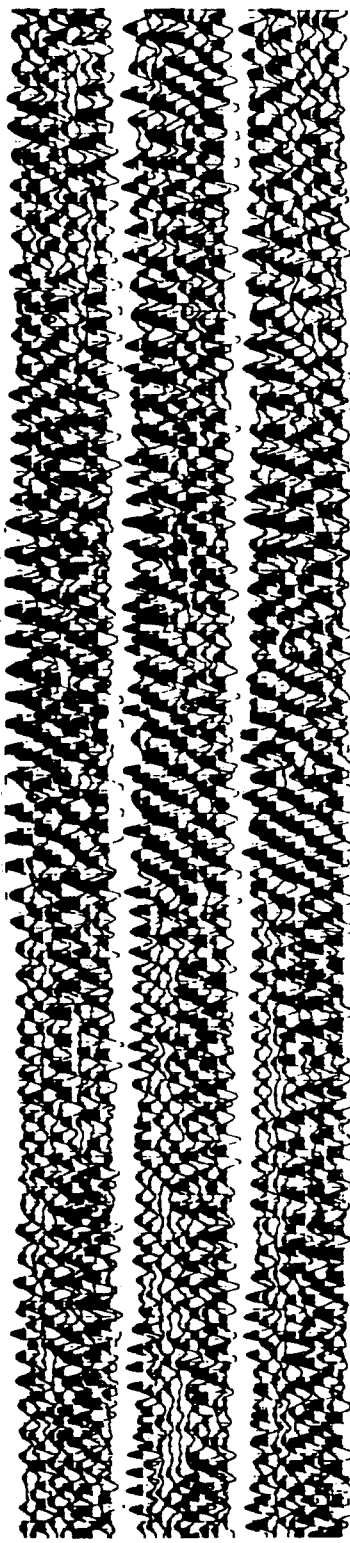
TEST 10 – ROAD TRAFFIC/FAR RANGE
FIG.13B

IPW SENSITIVITY TO POWER
(500 MS WINDOW, 15-FOLD STACK AND CROSS CORRELATION)

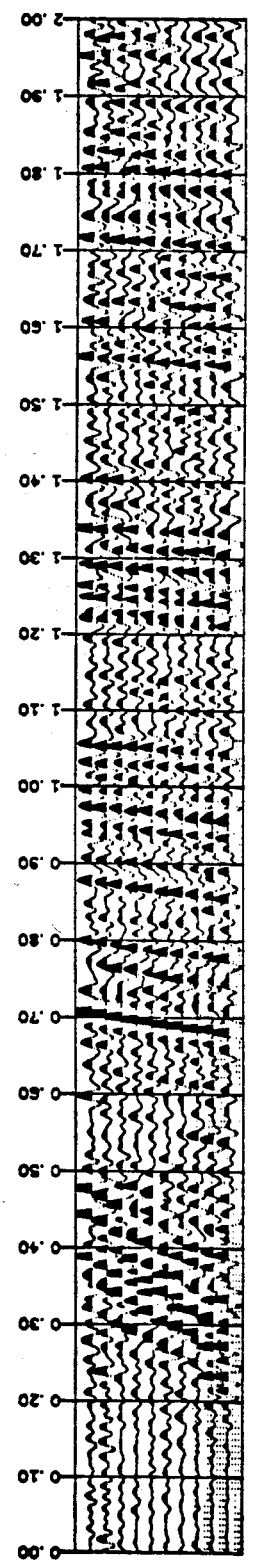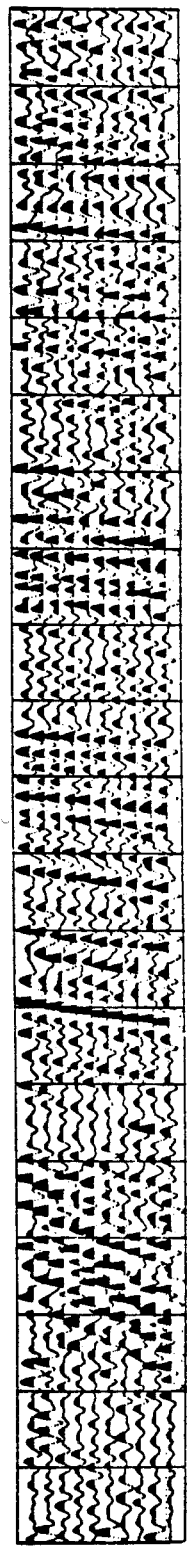
IPW SENSITIVITY TO WINDOW LENGTH
(EXPONENT 2, 15-FOLD STACK AND CROSS CORRELATION)
FIG. 15

4,561,075

METHOD AND APPARATUS FOR SELECTING INVERSE POWER WEIGHTING PRIOR TO VERTICALLY STACKING ACQUIRED SEISMIC DATA FOR SUPPRESSING NOISE

BACKGROUND OF THE INVENTION

This invention relates to geophysical exploration for petroleum and minerals. More particularly, this invention is directed to geophysical prospecting by means of the seismic technique.

Seismic prospecting involves generating seismic waves at the surface of the earth by means of a seismic source. The seismic waves travel downward into the earth and are reflected and/or refracted due to differences in acoustic impedance at the interfaces of various subsurface geological formations. Detectors, called seismometers, or geophones, located along the surface of the earth and/or in a borehole produce analog electrical seismic-trace signals in response to detected seismic wave reflections and/or refractions. The analog electrical seismic-trace signals from the seismometers, or geophones, can then be recorded. Alternatively, the analog electrical seismic-trace signals from the seismometers, or geophones, can be sampled and digitized prior to being recorded. The seismic-trace data recorded in either manner is subsequently processed and analyzed for determining the nature and structure of the subsurface formations. Specifically, this invention is directed to the suppression of noise which is present in the seismic-trace data, especially in the case where a low energy surface seismic source, such as a vibrator, is used for imparting seismic energy to the earth.

Many techniques for generating and recording seismic waves are currently in use. Exploding-gas and compressed-air guns placed on the surface of the earth and dynamite are examples of high energy seismic sources which generate a sharp pulse (impulse) of seismic energy. Vibrators, which generate a "chirp" signal of seismic energy, and hammers are examples of low energy surface seismic sources. In the case of vibrators, the recorded seismic wave reflections and/or refractions are cross-correlated with a replica (called the "pilot signal") of the original "chirp" signal in order to produce recordings similar to those which would have been produced with a high energy impulsive seismic source. This process is known as "vibroseis."

Considered in more detail, vibroseis seismic prospecting, commercialized by Continental Oil Company, typically employs a large, vehicle-mounted vibrator as a seismic source. The vehicle is deployed to a prospect area, and the vibrator is positioned in contact with the surface of the earth. Thereafter, the vibrator is activated for imparting vibrations to the earth, thereby causing seismic waves to propagate through the subsurface formations. The seismic wave reflections and/or refractions are detected by seismometers, or geophones, deployed in the prospect area.

Advantageously, the use of a vibrator can be more economical than the use of dynamite. Furthermore, as compared to the use of a high energy impulsive seismic source, such as dynamite, the frequency of the seismic waves generated by a vibrator can be selected by controlling the frequency of the pilot signal to the power source, such as a hydraulic motor, which drives the vibrator. More particularly, the frequency of the pilot signal to the vibrator power source can be varied, that is, "swept," for obtaining seismic-trace data at different frequencies. Consider, for example, Doty et al. U.S. Pat. No. 2,688,124 which discloses how a low energy seismic wave, such as generated by a vibrator, can be used effectively for seismic prospecting if the frequency of the vibrator "chirp" signal which generates the seismic wave is swept according to a known pilot signal and the detected seismic wave reflections and/or refractions are cross-correlated with the pilot signal in order to produce seismic-trace recordings similar to those which would have been produced with a high energy impulsive seismic source. Tyically, the pilot signal is a swept frequency sine wave which causes the vibrator power source to drive the vibrator for coupling a swept sine wave "chirp" signal into the earth. A typical swept frequency operation can employ, for example, a 10- to 20-second long sine wave "chirp" signal with a frequency sweep of 14 to 56 Hz. The swept frequency operation yields seismic-trace data which enables the different earth responses to be analyzed, thereby providing a basis on which to define the structure, such as the depth and thickness, of the subsurface formations.

Unfortunately, recorded seismic-trace data always includes some background (ambient) noise in addition to the detected seismic waves reflected and/or refracted from the subsurface formations (referred to as the "true earth response"). Noise can be classified as "stationary" and "nonstationary." In probabilistic terms, both stationary and nonstationary noise can be random. Stationary noise is random noise, such as atmospheric electromagnetic disturbances. Stationary noise is statistically time-invariant over the period of acquisition of seismic-trace data for producing a recording. Nonstationary noise is random and often occurs as bursts or spikes generally caused by wind, traffic, recorder electrical noise, etc. Nonstationary noise is statistically time-variant over the period of acquisition of seismic-trace data for producing a recording and exhibits relatively large excursions in amplitude.

When high energy impulsive seismic sources are used, the level of the detected true earth response seismic signal is usually greater than the ambient noise. However, when low energy surface seismic sources are used, the ambient noise can be at a level greater than the true earth response seismic signal. For this reason, seismic-trace recordings are often made involving the repeated initiation of a low energy surface seismic source at about the same origination point, thereby producing a sequence of seismic-trace data based on seismic wave reflections and/or refractions that have traveled over about the same path and therefore have approximately the same travel times. The process of adding such seismic-trace data together for improving the signal-to-noise ratio of the composite seismic-trace recording is known as "vertical compositing" or "vertical stacking." It should be distinguished from "horizontal stacking," a process applied to a sequence of seismic-trace data based on seismic wave reflections from approximately the same subsurface point (referred to as the "common-depth point," or "CDP") but which has been generated and recorded at different surface locations. Horizontal stacking of CDP seismic-trace data requires that time corrections (called "normal moveout," or "NMO," corrections) be applied before the traces are summed together, since travel times from seismic source to detector are unequal for each trace in the sequence. While this invention could be applied in either process, it is primarily intended to improve the vertical stacking process.

In connection with the earlier mentioned swept frequency operation of vibroseis seismic prospecting, it is common practice to vertically stack, or sum, the seismic-trace data from a series of initiations, that is, sequential swept frequency operations, to produce a composite seismic-trace recording for the purpose of improving the signal-to-noise ratio of the seismic-trace data. However, since the earliest days of vibroseis seismic prospecting, which is most economical when conducted along the existing road network where a large vehicle-mounted vibrator can be used, noise, and in particular, nonstationary noise such as burst noise associated with road traffic, has been recognized to have a severe adverse effect on seismic-trace data quality. Unless the nonstationary noise is somehow suppressed vis-a-vis the true earth response seismic signal, the ability to accurately map the subsurface formations is diminished.

Unfortunately, the commonly used technique described above of vertically stacking the seismic-trace data for the purpose of improving the signal-to-noise ratio has proven inadequate in the presence of nonstationary noise which appears during vibroseis seismic prospecting. That is, the low instantaneous transduced signal level of detected seismic wave reflections and/or refractions in the case of vibroseis seismic prospecting requires there be a long vibrator "chirp" signal duration, either a single very long swept frequency "chirp" signal or, more likely, a shorter swept frequency "chirp" signal (10–20 seconds) repeated many times. However, during the swept frequency operation, a large burst of noise will swamp the low instantaneous transduced signal level of detected seismic wave reflections and/or refractions and if digitized and vertically stacked will render the seismic-trace data unusable. The longer the duration of the greater the number of repetitions of the swept frequency "chirp" signal, the greater the risk of exposure to such fatal bursts of noise.

Interestingly, early analog field recording had such limited dynamic range that the noise bursts saturated the recording medium, whereby the noise was moderated to the extent that the recording was not rendered unusable. Digital field recording, on the other hand, with a cableless seismic digital recording system, such as the one disclosed in Weinstein et al. U.S. Pat. No. 3,946,357, records such noise bursts faithfully, thereby rendering the recording unusable. There is a need to improve the signal-to-noise ratio of seismic-trace data collected by digital field recording during seismic prospecting with a low energy surface seismic source in a noisy environment, particularly where nonstationary noise appears.

The following provides a more detailed analysis of known approaches which involve vertical stacking for improving the signal-to-noise ratio of seismic-trace data. Let the j-th digitized sample of the i-th seismic-trace signal $(X_{i,j})$ in a sequence which is to be vertically stacked be represented by:

$$X_{i,j} = \alpha_i(\sigma_{i,j} + \eta_{i,j}) \tag{1}$$

where $\sigma_{i,j}$ is the true earth response seismic signal, $\eta_{i,j}$ is the noise, and $\alpha_i$ is a scale factor (scalar) corresponding to seismic source and/or detector earth coupling and recorder amplifier gain variations.

The assumptions can be made that the true earth response seismic signal embedded in each trace is coherent and in phase (correlated) and that the noise is random and incoherent (uncorrelated) with zero mean value. Under such assumptions, the square value (variance) of any N-sample time "window," or portion, of the i-th trace is:

$$\sum_{j=1}^{N}(X_{i,j})^2 = \alpha_i^2 \sum_{j=1}^{N}(\sigma_{i,j})^2 + 2\alpha_i^2 \sum_{j=1}^{N}\sigma_{i,j}\eta_{i,j} + \alpha_i^2 \sum_{j=1}^{N}(\eta_{i,j})^2 \tag{2}$$

Since the noise is uncorrelated with the signal, the expected value of the middle term in Equation (2) is zero. In practice, the value is small and therefore can be neglected, resulting in:

$$\sum_{j=1}^{N}(X_{i,j})^2 = s_i^2 + n_i^2 = n_i^2(1 + \gamma_i) \tag{3}$$

where $S_i^2$ and $n_i^2$ are the received earth response seismic signal and noise variances, respectively, and $\gamma_i$ is the signal-to-noise power ratio of the i-th trace.

In general, the objective of vertical stacking is to maximize the signal-to-noise ratio of the resultant recording. To accomplish that objective, each seismic-trace signal sample is multiplied by a weighting function or scalar and summed with the other similarly weighted samples in the M-trace sequence. The j-th sample of the vertically stacked recording is then represented by:

$$Y_j = \sum_{i=1}^{M} \beta_i X_{i,j} \tag{4}$$

where $\beta_i$ is the weighting function or scalar. The signal-to-noise power ratio of the vertically stacked recording is:

$$\gamma = \left(\sum_{i=1}^{M}\beta_i s_i\right)^2 \bigg/ \left(\sum_{i=1}^{M}\beta_i n_i\right)^2 \tag{5}$$

Since the noise is uncorrelated from trace to trace within the M-trace sequence, the expected value of the cross terms in the denominator of Equation (5) is zero. In practice, the value of the summed cross terms is small and therefore can be neglected, resulting in:

$$\gamma = \left(\sum_{i=1}^{M}\beta_i s_i\right)^2 \bigg/ \left(\sum_{i=1}^{M}\beta_i^2 n_i^2\right) \tag{6}$$

In order to determine the optimum weighting values which maximize the signal-to-noise power ratio, the partial derivative of $\gamma$ in Equation (6) with respect to some $\beta_K$, where K is between 1 and M, inclusive, is equated to zero. The result of this operation after some simplification is:

$$\beta_K n_K^2 / s_K = \left(\sum_{i=1}^{M}\beta_i^2 n_i^2\right) \bigg/ \left(\sum_{i=1}^{M}\beta_i s_i\right) \tag{7}$$

In the case M=1, Equation (7) is trivial, and $\beta_1$ is arbitrary.

In the case M=2, we let K=2, and after algebraic mainpulation, we then have $$\beta_2 = \beta_1(n_1{}^2 s_2/n_2{}^2 s_1) \tag{8}$$

Now, we let $\beta_1$, an arbitrary quantity, be $\beta_1 = s_1/n_1{}^2$. Therefore, Equation (8) becomes:

$$\beta_2 = s_2/n_2{}^2 \tag{9}$$

Using mathematical induction, we assume that $\beta_i = s_i/n_i{}^2$ for all i between 1 and M-1, inclusive. In order to prove $\beta_M = s_M/n_M{}^2$, then it follows from Equation (7), letting K=M:

$$\beta_M n_M{}^2 / s_M = \sum_{i=1}^{M} \beta_i{}^2 n_i{}^2 / \sum_{i=1}^{M} \beta_i s_i \tag{10}$$

After algebraic manipulation, we have:

$$\beta_M = s_M/n_M{}^2 \tag{11}$$

Consequently, the optimum weighting value for the i-th trace is:

$$\beta_i{}^* = s_i/n_i{}^2 = \gamma_i/s_i \tag{12}$$

In order to maximize $\gamma$, Equation (12) requires that each seismic-trace signal sample be weighted in proportion to its true earth response seismic signal amplitude and inversely to its noise power. Substituting this requirement into Equation (6) yields:

$$\gamma^* = \sum_{i=1}^{M} s_i{}^2/n_i{}^2 = \sum_{i=1}^{M} \gamma_i \tag{13}$$

which implies that, under optimum weighting, the signal-to-noise power ratio of the optimum vertically stacked recording is equal to the sum of the signal-to-noise power ratios of the seismic-trace signals.

While Equation (12) is mathematically exact under the assumptions of coherent, in-phase true earth response seismic signal and random noise, computation of the optimum weighting value requires statistical estimation of $s_i$ and $n_i{}^2$, or $s_i$ and $\gamma_i$. Among others, Robinson, "Statistically Optimal Stacking of Seismic Data," *Geophysics*, June 1970, proposes and evaluates schemes for determining these statistical estimates through auto-correlations and cross-correlations of the seismic-trace signals. Such schemes require considerable computer execution time and memory storage, thereby rendering them impractical and uneconomical in field recording environments.

However, Robinson's application to synthetic and actual field seismic-trace data demonstrates that while a maximum signal-to-noise ratio of the vertically stacked seismic-trace data is achieved when statistical estimates of $s_i$ and $n_i{}^2$ are available, sufficiently improved results are possible with approximations. The approximations relate only to the manner in which the weighting values are determined.

The simplest approximation occurs when $s_i$ and $n_i{}^2$ do not change from 1 seismic-trace signal to the next. In this case, $\beta_i$ in Equation (12) is a constant, and computation of relative weighting values is not required. If $s_i$ and $n_i{}^2$ are constant, then so too is $\gamma_i$. Therefore, the signal-to-noise power ratio improvement in the vertically stacked recording is simply $\gamma^* = M\gamma$ where $\gamma$ is the signal-to-noise power ratio of the seismic-trace signals. Also, note that the signal-to-noise amplitude ratio is improved by a factor of $\sqrt{M}$. This approximation, often referred to as "true amplitude" summation, is implemented in various commercially available digital field recorders.

However, consider several repetitions of a swept frequency "chirp" signal at each of a plurality of vibration points for providing a set of seismic-trace data from which the true earth response is to be statistically estimated. Assume one recording within the set to be in the presence of very high burst noise. Because of the non-stationarity of burst noise, true amplitude summation in fact gives an estimate of the noise, not the true earth response, and therefore, a simple addition of the seismic-trace data for the repetitions as disclosed in Weinstein et al. U.S. Pat. No. 3,946,357 by means of true amplitude summation would be dominated by the noise.

Another relatively simple approximation results when the assumption is made that $s_i$ is the same for all seismic-trace signals and that $n_i{}^2$ is approximately equal to the average absolute value of the i-th trace. Then, Equation (12) reduces to:

$$\beta_i{}^* \propto 1 / \left( \sum_{j=1}^{N} |X_{i,j}| \right) \tag{14}$$

This process is comparable to applying "digital AVC" to each trace before vertical stacking and is related to mantissa-only, sign bit, and automatic gain control (AGC) recording implemented in various commercially available digital field recorders.

However, again consider several repetitions of a swept frequency "chirp" signal at each of a plurality of vibration points for providing a set of seismic-trace data from which the true earth response is to be statistically estimated. Assume one recording within the set to be in the presence of very high burst noise. Assume also that the very noisy recording can be multiplied by a weight between one and zero. If, on the one hand, the weight is one, the result is true amplitude summation and, in such a case, the one noisy recording will overwhelm the others, the resulting estimate being that of noise only as indicated above. In contrast, a factor less than one can be applied for weighting the very noisy recording so that the impact on the estimate is approximately the same as the less noisy recordings, which is the motivation for mantissa-only, sign bit, and AGC recording. Importantly, such features can be implemented on almost all field hardware inexpensively in a way which is time and trace variable (which is critical since noise is time and trace variable). However, mantissa-only and sign bit recording affect the seismic-trace data frequency content due to stepwise transitions in the digitized traces and thereby cause a loss of informational content. AGC recording does not generally result in a loss of informational content, but at best AGC recording reduces the impact of the very noisy recording on the estimate only slightly, since the noise within the recording will dominate that recording as there is no noise suppression within the recording, that is, the recording is virtually all noise. Hence, the noise is significant because the very noisy recording is accorded the same contribution to the estimate as the less noisy recordings.

Embree U.S. Pat. No. 3,398,369 discloses an approximation known as "diversity stacking" which assumes that the true earth response seismic signal amplitude can be estimated from the total powder in the "early" portion of the trace (that is, $s_i \alpha \sqrt{\Sigma X_{i,j}^2}$) and the noise power from the total power in the "late" portion of the trace (that is, $n_i^2 \alpha \Sigma X_{i,j}^2$). Equation (12) can then be estimated from the ratio of these true earth response and noise power estimations under the assumption that $s_i$ is nearly the same for all seismic-trace signals and variations in the total power from one trace to the next for any given window are dominated by variations in noise. Accordingly, Equation (12) can be approximated by:

$$\beta_i^* \propto 1 / \left( \sum_{j=1}^{N} X_{i,j}^2 \right) \quad (15)$$

Implementation of diversity stacking consists of first partitioning each seismic-trace signal into a series of windows. Next, the total power in each window is computed, and the seismic-trace data is scaled by a windowwise linear function of the inverse of the power in that window and the power in the previous window. (It should be noted, in passing, that the calculation and application of weighting scale factors could also be accomplished over "moving windows;" such a scheme, however, would require more computational complexity.) Finally, the scaled seismic-trace data is algebraically summed and normalized prior to recording. The normalization scale factors are inversely proportional to the sum of the weighting scale factors on a per window basis.

Diversity stacking is time variable depending on the length of the portion of the recording on which the weighting scale factor is based. This process is implemented in various commercially available digital field recorders and has been used for reducing burst and spike noise in vibroseis seismic prospecting recordings.

Nevertheless, in some commercially available digital field recorders wherein diversity stacking has been implemented, the weighting scale factors are determined by:

$$\beta_i^* = \begin{cases} c_1 / \left( \sum_{j=1}^{N} X_{i,j}^2 \right) & \text{for } \epsilon_1 > \left( \sum_{j=1}^{N} X_{i,j}^2 \right) > \epsilon_2 \\ c_2 & \text{for } \left( \sum_{j=1}^{N} X_{i,j}^2 \right) < \epsilon_2 \\ c_3 & \text{for } \left( \sum_{j=1}^{N} X_{i,j}^2 \right) > \epsilon_1 \end{cases} \quad (16)$$

where $c_1$, $c_2$, $c_3$, $\epsilon_1$, and $\epsilon_2$ are constants and comparative limits. This reduces the chance that a near-zero seismic-trace signal will dominate the vertically stacked recording and at the same time allows a high-noise trace to be "muted" or "blanked."

However, diversity stacking disclosed in Embree U.S. Pat. No. 3,398,396 is based on the assumption that the magnitude of the noise on each recording is calculable so that the exact weighting scale factor can be calculated for each recording at a given vibration point that will maximize the signal-to-noise ratio. (The weighting scale factor is the inverse square of the noise amplitude.) Unfortunately, one does not know the amplitude of the noise on each recording. One only knows the amplitude of the noise plus the true earth response seismic signal.

In any event, diversity stacking has been found to have various limitations. One limitation is that the use of diversity stacking does not yield an optimum signal-to-noise ratio in circumstances where the level of the true earth response seismic signal is comparable in magnitude to the nonstationary noise. Since the true earth response seismic signal, which includes components such as ground roll and refractions, is often comparable in magnitude to burst noise which appears during vibroseis seismic prospecting, diversity stacking does not always provide adequate noise suppression in noisy vibroseis seismic prospecting. Another limitation of diversity stacking is the difficulty and complexity of implementation in field hardware.

Reject recording is implemented in some commercially available digital field recorders. Reject recording causes a weighting scale factor of zero to be applied if a predetermined threshold is reached. The effect of noisy recordings are eliminated, that is, rejected. However, reject recording affects the seismic-trace data frequency content and thereby causes a loss of informational content, and furthermore, the required adjustments of threshold for producing such rejection have proven difficult to carry out in the field. Reject recording is dependent upon predetermined selection of threshold, which, if improperly selected, can, on the one hand, completely eliminate all true earth response seismic signals or, on the other hand, fail to reject any noise.

Other noise suppression schemes have been proposed which are independent of weighting prior to vertical stacking. Examples of such schemes are disclosed in Schmitt U.S. Pat. No. 3,744,019 and Siems U.S. Pat. No. 3,894,222, for instance.

SUMMARY OF THE INVENTION

In accordance with the present invention, a method and apparatus are provided for optimizing the signal-to-noise ratio in the presence of ambient noise, including nonstationary noise, which appears during seismic prospecting with a low energy surface seismic source. Consequently, the noise is suppressed, and the true earth response seismic signal is emphasized. The method and apparatus of the invention facilitate implementation of a signal-to-noise optimization technique in a digital field recorder.

The method of the invention provides signal-to-noise optimization based on vertically stacking, that is, summing, inverse power weighted seismic-trace signals wherein the exponent used for weighting is selectable for optimizing the signal-to-noise ratio of the resultant composite seismic-trace signal. The range of exponents provided is correlated to produce suppression of ambient noise within the range of ambient noise, including nonstationary noise, commonly encountered during seismic prospecting with a low energy surface seismic source. The exponents preferably include zero, one, two, and four.

The weighting value is equivalent to the inverse of the sum of the magnitudes of the instantaneous seismic-trace signal values taken to the selected exponent. (The magnitudes are first raised to the exponent, and then a summation is performed.) This is in contrast to the preferred inverse power weighting and vertical stacking method disclosed in a co-pending patent application of Warmack (T-8577) filed on the same data as this application and assigned to a common assignee and hereby incorporated by reference into this specification to form a part thereof. The method of the invention for optimizing the signal-to-noise ratio of seismic-trace signals includes various steps for processing acquired incoming seismic-trace signals which correspond to the seismic wave reflections and/or refractions associated with seismic prospecting and detected by means of seismometers, or geophones. Based on the ratio of the expected level of true earth response seismic signal and the expected level of ambient noise which appears during seismic prospecting, including nonstationary noise such as burst noise due to traffic which appears during vibroseis seismic prospecting, the step is performed of selecting at least one exponent for use in inverse power weighting the seismic-trace signals with the objective of optimizing the signal-to-noise ratio through the selection of the exponent which determines the weighting values. The method of the invention then requires the steps of dividing each incoming seismic-trace signal into a series of component seismic-trace signals, each within a time window of a predetermined length, and calculating weighting values based on the selected exponent and applying them to the respective component seismic-trace signals. The weighting value for the window is the inverse of the result determined by the sum of the magnitudes of the seismic-trace signal samples, which comprise the component seismic-trace signal within the window, taken to the selected exponent (each magnitude is first raised to the exponent, and then a summation is performed), and the weighting value is then applied to each sample within the windows. Preferably, the weighting value for the window which is actually applied is based on a linear interpolation between the weighting value calculated for the previous window, if any, and the weighting value calculated for the current window. Finally, the method of the invention includes the step of vertically stacking, that is, summing, the weighted component seismic-trace signals, thereby forming a composite seismic-trace signal. Preferably, the composite seismic-trace signal is normalized based on the sum of the weighting values for the seismic-trace signal samples prior to being recorded.

The selection of the at least one exponent is based on the ratio of the expected level of true earth response seismic signal to the expected level of ambient noise, including both stationary and nonstationary noise, encountered during seismic prospecting. Selection of the exponent can taken the presence of ground roll into consideration. The effect of ground roll is more significant near the seismic source. Consequently, the true earth response seismic signal, including ground roll, can be comparable in magnitude to the ambient noise, including nonstationary noise, which appears during seismic prospecting near the seismic source, and, accordingly, a relatively high exponent, that is, higher than two, can be selected for inverse power weighting seismic-trace signals received at locations near the seismic source. However, since the effect of ground roll does not extend a great distance from the seismic source, the true earth response seismic signal can be smaller in magnitude than the ambient noise, especially nonstationary noise, which appears during seismic prospecting remote from the seismic source, and, accordingly, a lower exponent, such as two, can be selected for inverse power weighting seismic-trace signals received at locations remote from the seismic source. Furthermore, since ground roll attenuates rapidly, the exponent selected for inverse power weighting seismic-trace signals received at locations near the seismic source can be reduced during acquisition of seismic-trace data after the effect of ground roll dissipates.

In accordance with a preferred embodiment of apparatus for implementing the method of the invention whereby seismic-trace signals are inverse power weighted prior to being vertically stacked for optimizing the signal-to-noise ratio, an improved recorder is provided for a cableless seismic digital recording system. A coded signal is radioed by a control means to the recorder remotely deployed in a prospect area. The coded signal includes a code for selecting the appropriate exponent used in the method of the invention for optimizing the signal-to-noise ratio.

The recorder of the invention exhibits significant advantages over commercially available digital field recorders. There is no thresholding required in order to suppress nonstationary noise. Furthermore, the recorder achieves the added advantage of being able to suppress nonstationary noise without sacrificing the advantages of a cableless seismic digital recording system, which is characterized by the absence of such noise as 60 Hz line pickup and channel cross-talk which occurs in the master cable of conventional seismic digital recording systems.

BRIEF DESCRIPTION OF THE DRAWINGS

The above and other features of this invention and a better understanding of the principles and details of the invention will be evident to those skilled in the art in view of the following description of the preferred embodiments given in conjunction with the accompanying drawings, in which:

FIG. 3, comprising FIGS. 3A through 3L, is a flow chart which illustrates how the recorder of FIG. 2 performs the inverse power weighting and vertical stacking method of the invention;

FIGS. 4 through 13 are seismograms of field tests conducted with the preferred embodiment of the invention in comparison with a commercially available digital field recorder;

FIG. 15 is a seismogram which shows the effect of different window lengths on the inverse power weighting and vertical stacking method of the invention.

DESCRIPTION OF THE PREFERRED EMBODIMENTS

Vibroseis seismic-trace data quality is improved by reducing ambient noise, including nonstationary noise such as burst and spike noise caused by wind, traffic, and so forth. Diversity stacking described above has been shown to produce results which are superior to unweighted true amplitude summation; but it has been found that diversity stacking does not yield an optimum signal-to-noise ration in circumstances where the level of true earth response seismic signal, which includes components such as ground roll and refractions, is comparable in magnitude to ambient noise which appears during vibroseis seismic prospecting.

Recognizing that the true earth response seismic signal can be comparable in magnitude to the ambient noise which appears during vibroseis seismic prospecting, in accordance with the present invention the mean of exponents higher than two of the samples in a window can be selected to optimize the signal-to-noise ratio in the presence of severe nonstationary noise. Therefore, in accordance with the method of the invention. Equation (12) is approximated by:

$$\beta_i^* \propto 1 / \left( \sum_{j=1}^{N} |X_{i,j}|^m \right) \tag{17}$$

which reduces to Equation (15) when m=2. For higher exponents (m>2), criteria can be set for determining noise suppression.

Figure 1A:
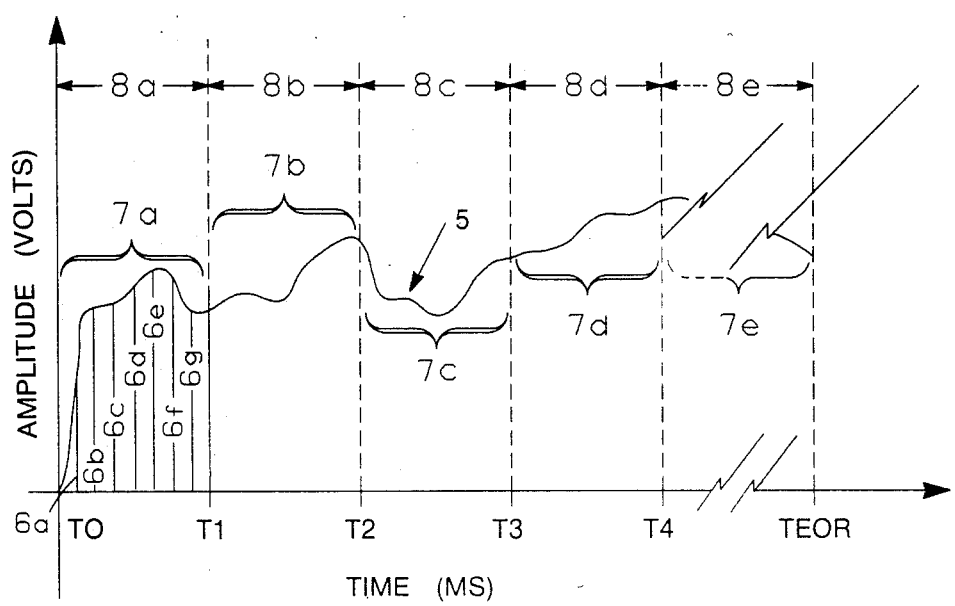
FIG. 1A shows a seismic-trace signal to be inverse power weighted and vertically stacked in accordance with the method of the invention.

In accordance with the inverse power weighting and vertical stacking method of the invention, as shown in FIG. 1A, each incoming seismic-trace signal 5 from a seismometer, or geophone, is sampled at a predetermined sampling frequency, and the samples, such as the samples 6a–6g, are digitized. The incoming seismic-trace signal 5 comprises one trace and is the result of one initiation of a low energy surface seismic source, for example, one sweep of a vibrator. The sampling frequency can be 500 Hz, for example, which means that the incoming seismic-trace signal 5 is sampled every two milliseconds. Furthermore, each incoming seismic-trace signal 5 is divided into a series of component seismic-trace signals 7a–7e within respective windows 8a–8e. The period of each of the windows 8a–8e (T1-T0, T2-T1, etc.) must be sufficiently long in order to assure a statistically reliable estimate of the signal-plus-noise level, half a second, for example, as will be described later. The assumption is made that if the energy within the incoming seismic-trace signal 5 varies from trace to trace for any given window, the variation is due to noise rather than the true earth response seismic signal. Hence, a weighting value is applied to the incoming seismic-trace signal samples within a window based on the inverse of the sum of the magnitudes of the incoming seismic-trace signal samples in that window taken to a selected exponent.

A weighting value is initially calculated for the window under consideration, such as the window 8a. The weighting value is the inverse of the sum of the magnitudes of the incoming seismic-trace signal samples 6a–6g, which comprise the component seismic-trace signal 7a within the window 8a, taken to the selected exponent. The weighting value is then applied to each of the incoming seismic-trace signal samples in the window.

During the first window, such as the window 8a, a constant weighting value is applied, since there is no weight for a previous window on which to base a weighting value. For each of the successive windows, such as the windows 8b–8e, a weighting value is again calculated as the inverse of the sum of the magnitudes of the incoming seismic-trace signal samples, which comprise the component seismic-trace signal in the respective window, taken to the selected exponent. However, over each of the successive windows 8b–8e, a linear interpolation is preferably made between the calculated weighting value of the previous window and the calculated weighting value of the current window in order to assure continuity of seismic-trace data. As the individual incoming seismic-trace signal samples which comprise the component seismic-trace signal within each of the successive windows 8b–8e are weighted, the weighting value is interpolated between the calculated weighting value of the previous window and the calculated weighting value of the current window.

The inverse power weighted seismic-trace signal samples produced in response to the current incoming seismic-trace signal are then vertically stacked, that is, summed, with the "corresponding" inverse power weighted seismic-trace signal samples of previous seismic-trace signals. By corresponding is meant the seismic-trace signal samples obtained during sampling at corresponding times with respect to the plural initiations of the seismic source, for example, with reference to T0 in FIG. 1A. The end result is a composite seismic-trace signal. Preferably, the composite seismic-trace signal is normalized prior to recording by dividing respective weighted and vertically stacked seismic-trace signal samples by the sum of the weighting values applied in the inverse power weighting of the respective seismic-trace signal samples.

The method of the invention for vertically stacking inverse power weighted seismic-trace signals, wherein the magnitude of each of the incoming seismic-trace signal samples is raised to the selected exponent and then a summation is performed and the inverse of the result comprises the weighting value, is given by the following mathematical expression, hereinafter referred to as Equation (18):

$$Y_i = \frac{\sum_{j=1}^{M} \{W_{j,k-1} + (i - (k-1)N)(W_{j,k} - W_{j,k-1})/N\} X_{i,N(k-1)+j}}{\sum_{j=1}^{M} \{W_{j,k-1} + (i - (k-1)N)(W_{j,k} - W_{j,k-1})/N\}} \tag{18}$$

for $i = 1$ to $NS$ where: $k = \left| \frac{i - 1 + N}{N} \right|^*$ $$W_{j,k} = \left[ \sum_{i=kN-N+1}^{kN} |X_{i,j}|^m \right]^{-1}$$

for $k = 1$ to $\left| \frac{NS + N - 1}{N} \right|^*$ $W_{j,0} = W_{j,1}$   $m \geq 0$ (any nonnegative real number)
*truncation $X_{i,j} \triangleq$ i-th input sample of incoming seismic-trace signal from j-th sweep $Y_i \triangleq$ i-th output sample of vertically stacked composite seismic-trace signal $W_{j,k} \triangleq$ weight of k-th window of j-th sweep $N \triangleq$ number of samples of incoming seismic-trace signal per window $M \triangleq$ number of sweeps $NS \triangleq$ number of samples of incoming seismic-trace signal per sweep As shown in Equation (18), the step of inverse power weighting has an exponent m associated therewith. (In inverse power weighting, by power is meant exponent and not the kind of power associated with amplitude squared.) In accordance with the invention, the exponent is selectable for optimizing the signal-to-noise ratio of the composite seismic-trace signal formed by inverse power weighting and vertically stacking, that is, summing, the incoming seismic-trace signals. Inverse power weighting exponents preferably include: exponent zero in which the weights are independent of the sample values and the vertically stacked result is equivalent to an unweighted floating-point sum; and exponent one in which the weights are inversely proportional to the average of the absolute sample values; and exponent two in which the weights are inversely proportional to the average of the squared sample values and the vertically stacked result is dominated by the lowest-energy seismic-trace signals; and exponent four in which the weights are inversely proportional to the average of the fourth power of the sample values and the vertically stacked result is dominated even more by the lowest-energy seismic-trace signals. Exponent zero is equivalent to true amplitude summation. Exponent one is equivalent to AGCing records before summation and is similar in many ways to mantissa-only and sign bit recording. Exponent two is equivalent to diversity stacking. Higher exponents, such as four, eight, and greater, exhibit characteristics of a well adjusted reject recording.

Figure 1B:
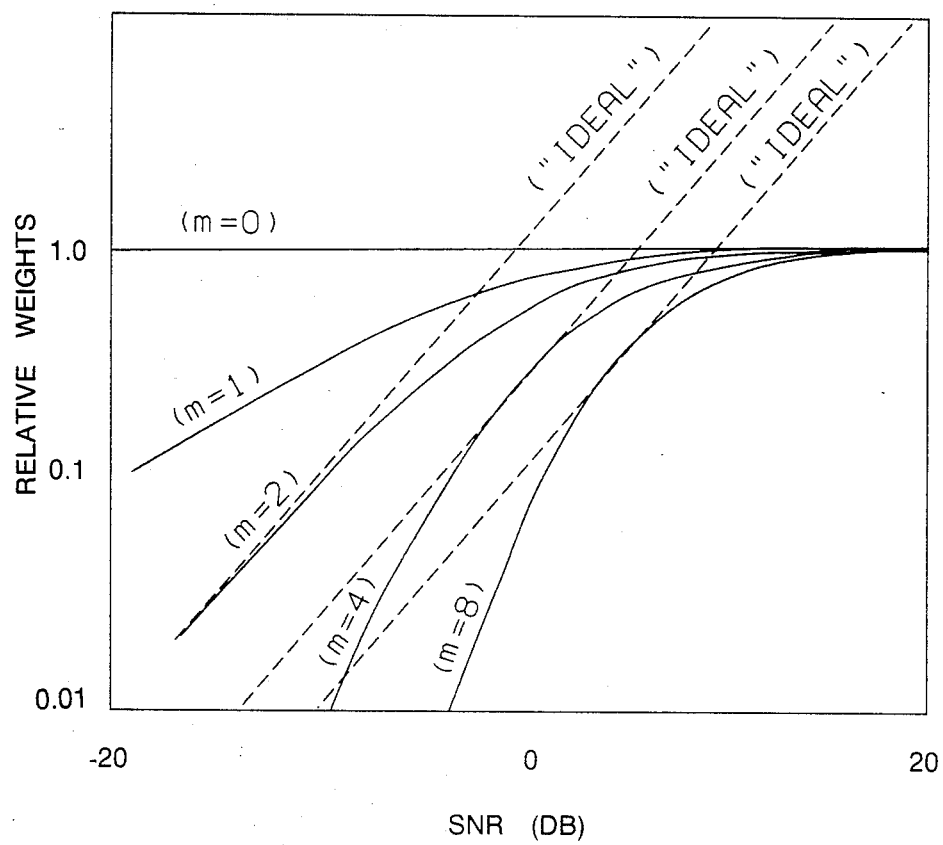
FIG. 1B illustrates the relative weights versus signal-to-noise ratio (SNR) for various exponents (m) in connection with an example of the method of the invention for inverse power weighting and vertically stacking seismic-trace signals.

FIG. 1B shows the relative weights versus signal-to-noise ratio for the inverse power weighting and vertical stacking method in accordance with Equation (18). The curves labeled m=0, 1, 2, ... 8 are the relative values of weights that are calculated from Equation (18). Fundamentally, the absolute values of the seismic-trace signal elements (noise plus true earth response seismic signal) are raised to an exponent and summed to calculate a reciprocal weight. The "ideal" line is the relative weight which would give the optimum estimate.

For example, an effective weight of one (true amplitude summation) for all signal-to-noise ratios is given by an inverse power weighting exponent of zero. (Any number to the zero exponent is one.) However, if the quiet signal-to-noise conditions were 0 dB and a burst noise condition during one recording had a signal-to-noise ratio of −20 dB, the optimum relative weight as shown in FIG. 1B would be 1:100. But true amplitude summation (exponent zero) weights each recording equally, which means an error of a factor of 100 on the burst noisy trace. With this magnitude error, it is no wonder that true amplitude estimation in burst noise conditions yields unusable seismic-trace data. Inverse power weighting calculated with an exponent of one functions much like mantissa-only and sign bit recording. It reduces the size of the burst noise to the same magnitude as the good recordings. In the example shown in FIG. 1B, the factor is 1:5.5. (Remember the ideal ratio is 1:100.) The inverse power weighting exponent of two uses 1:30 as is the case with diversity stacking. The inverse power weighting exponent of four uses 1:915. High exponents (much greater than two) function much like reject recording.

Figure 1C:
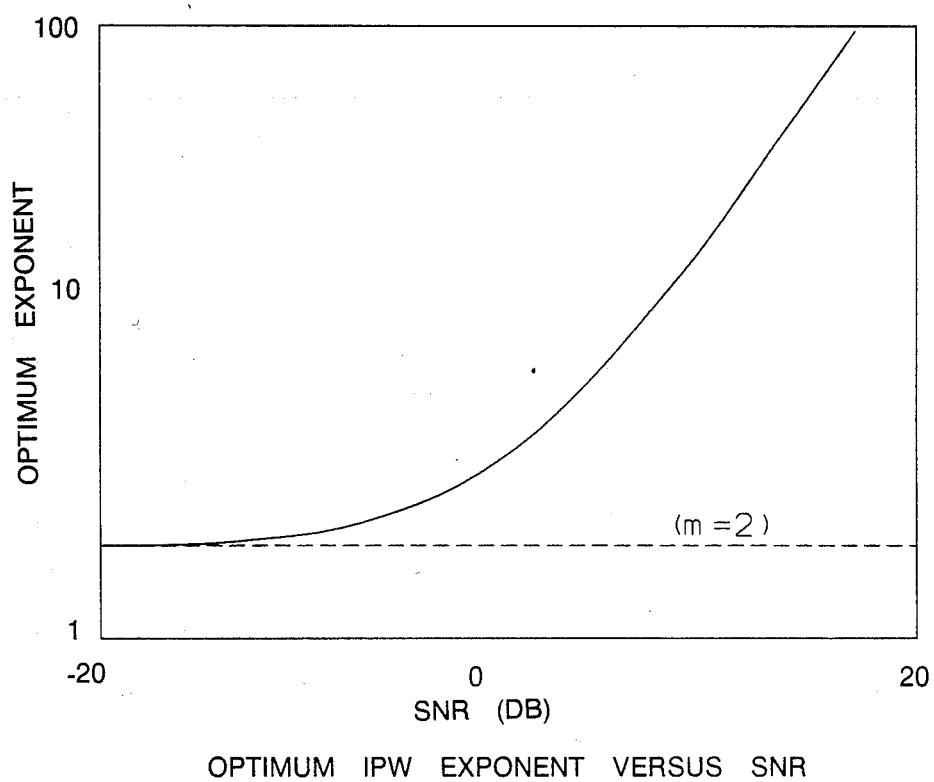
FIG. 1C shows the optimum exponent for use in the inverse power weighting and vertical stacking method of the invention as a function of uncorrelated signal-to-noise.

Note from FIG. 1B that for prospect areas with higher signal-to-noise ratios (because of stronger ground roll and refractions, for example) the effectiveness of higher exponents is dramatic. If the quiet conditions were signal-to-noise of approximately 20 dB and the burst noise condition is signal-to-noise of approximately 0 dB, the ideal relative weight is still 1:100, but an exponent of two (diversity stacking) gives only a relative weight of 1:3.3. An exponent of four gives a relative weight of 1:11, and an exponent of eight yields 1:120. The exponent eight compares nicely with the ideal of 1:100. The optimum exponent as a function of uncorrelated signal-to-noise is shown in FIG. 1C which provides a reference for optimizing the signal-to-noise ratio.

In accordance with a preferred embodiment of the invention, recorder apparatus of the type disclosed in Broding et al. U.S. Pat. No. 3,806,864 is improved to include a seismic-trace data processing capability for vertically stacking inverse power weighted seismic-trace signals in accordance with Equation (18). The disclosure of Broding et al. U.S. Pat. No. 3,806,864 is hereby incorporated by reference into this specification to form a part thereof. The seismic-trace data processing capability is preferably implemented by the incorporation of a microcomputer means and a memory within the remotely deployed digital field recorder of the cableless seismic digital recording system disclosed in Broding et al. U.S. Pat. No. 3,806,864. Preferably, the recorder of the invention comprises cableless seismic digitial recorder apparatus of the type disclosed in Broding et al, U.S. Pat. No. 3,806,864 wherein the logic circuitry disclosed in that patent (which controls the sequence of actions within the recorder apparatus) is replaced by microcomputer circuitry and memory circuitry for both controlling the recorder and processing seismic-trace data. (The power supply circuitry is altered also but forms no part of the invention.)

Figure 2:
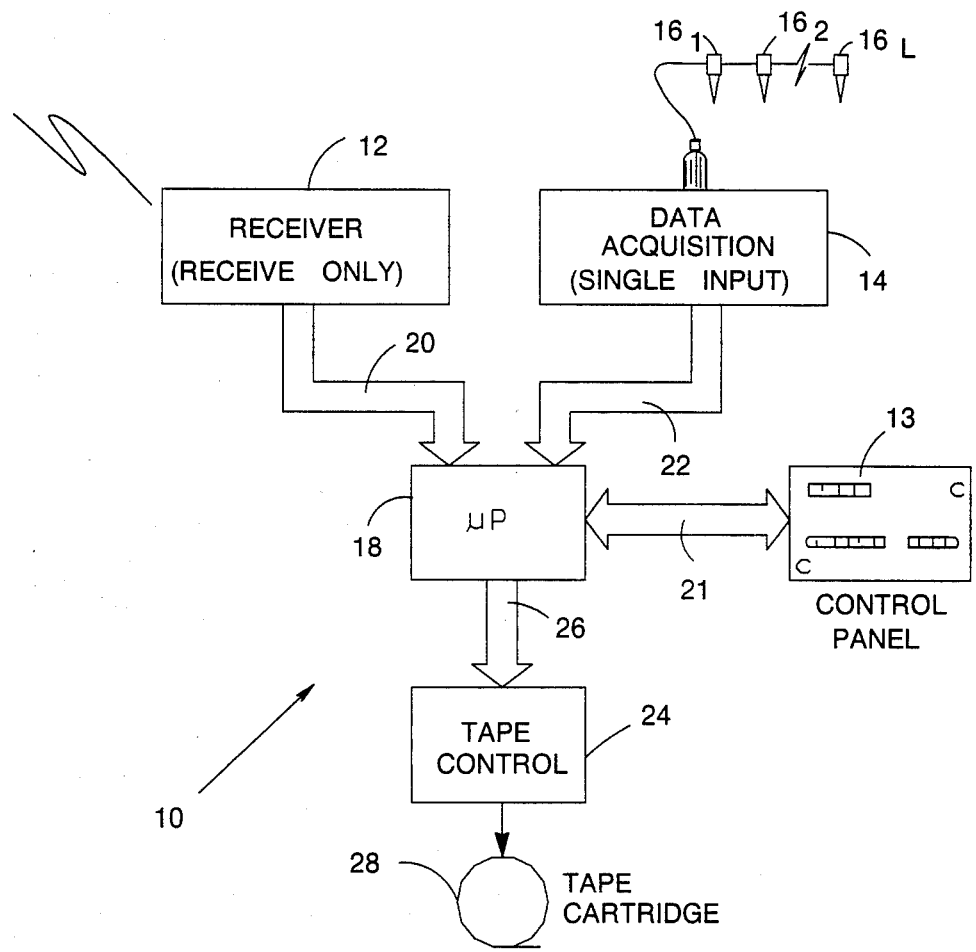
FIG. 2 is a block diagram of the preferred embodiment of the recorder of the invention.

As shown in FIG. 2, the preferred embodiment of the recorder of the invention, generally indicated by the numeral 10, includes a radio receiver circuit 12. The radio receiver circuit 12 is more fully described in a co-pending patent application of Read et al. (T-8156 et al.) filed on the same date as this application and assigned to a common assignee and hereby incorporated by reference into this specification to form a part thereof. The radio receiver circuit 12 receives coded signals radioed by a control means (not shown) which forms the subject of a co-pending patent application of Bogey et al. (T-8547) also filed on the same date as this application and assigned to a common assignee and hereby incorporated by reference into this specification to form a part thereof. Among the coded signals which can be radioed is a code to inverse power weight and vertically stack seismic-trace signals as well as the exponent to be used for weighting which is selectable for optimizing the signal-to-noise ratio of the composite seismic-trace signal. Alternatively, the code to inverse power weight and vertically stack seismic-trace signals as well as the exponent to be used for weighting can be entered by means of a control panel 13.

The recorder 10 also includes an analog-to-digital converter circuit 14 which receives analog electrical seismic-trace signals from a group of seismometers, or geophones, $16_1$, $16_2$, ... $16_L$ and digitizes the analog electrical seismic-trace signals. The analog-to-digital converter circuit 14 is more fully described in the aforementioned co-pending Read et al. application.

The recorder 10 further includes a microcomputer circuit 18 which receives coded signals from the radio receiver circuit 12 over a data bus 20 and/or the control panel 13 over a data bus 21 and also receives digitized seismic-trace signals from the analog-to-digital converter circuit 14 over another data bus 22. The microcomputer circuit 18 then performs the function of logic circuitry, as well as inverse power weighting and vertical stacking in its spare time by means of the instructions in the microcomputer's program. The features of the recorder 10 may be modified by simply changing the program of the microcomputer circuit 18 (within the limits of the hardware). The program written for the microcomputer circuit 18 to implement the method of the invention for vertically stacking inverse power weighted seismic-trace signals in accordance with Equation (18) will be described in more detail later in connection with FIG. 3.

Preferably, as shown in FIG. 2, a tape control circuit 24 receives the composite seismic-trace signal from the microcomputer circuit 18 over a data bus 26. The tape control circuit 24 then transfers the composite seismic-trace signal to a tape 28.

Generally, once the coded signals have been received by the radio receiver circuit 12 and it is determined that the recorder 10 is in the inverse power weighting and vertical stacking mode, a main program implemented in the microcomputer circuit 18 starts to read incoming seismic-trace signal samples from the analog-to-digital converter circuit 14 into a first window buffer memory. When this buffer memory is full, the main program redirects the incoming seismic-trace signal samples into a second window buffer memory and gives control to an inverse power weighting and vertical stacking program. The program is then ready to weight and sum the first window into the stack.

Initially, the inverse power weighting and vertical stacking program calculates the weighting value for the window and then applies the calculated weighting value to each of the seismic-trace signal samples which comprise the component seismic-trace signal within the window. The incoming seismic-trace signal is preferably separated into approximately half-second windows over which the respective weighting values are calculated. As indicated by Equation (18), the weighting value is the inverse of the sum of the magnitudes of the seismic-trace signal samples, which comprise the component seismic-trace signal within the window, taken to the selected exponent.

During the first window of each incoming seismic-trace signal, a constant weighting value is applied, since there is no weight for a previous window on which to base a weighting value. For each of the successive windows, a weighting value is again calculated as the inverse of the sum of the magnitudes of the seismic-trace signal samples, which comprise the component seismic-trace signal within the respective window, taken to the selected exponent. Over each of the successive windows a linear interpolation is preferably made between the calculated weighting value of the previous window and the calculated weighting value of the current window in order to assure continuity of seismic-trace data. As the individual samples which comprise the component seismic-trace signal within each of the successive windows are weighted, the weighting value is interpolated between the calculated weighting value of the previous window and the calculated weighting value of the current window. The result of the current window is then summed with the accumulated results of corresponding earlier windows to form the composite seismic-trace signal.

Power is maintained on the microcomputer circuit 18 and memories between sweeps in order to retain the accumulated sum of weighted seismic-trace signals. The accumulated sum of weighted seismic-trace signals is stored in a 32K byte bulk random access memory included in the microcomputer circuit 18. Preferably, during the last sweep before the composite seismic-trace signal is recorded on the tape 28, the composite seismic-trace signal is normalized. The composite seismic-trace signal is preferably normalized by dividing respective weighted and vertically stacked seismic-trace signal samples by the sum of the weighting values applied in the inverse power weighting of the respective seismic-trace signal samples. Otherwise, the inverse power weighting and vertical stacking program waits for the next window buffer memory to become full. At the appropriate instruction, the bulk memory is written to the tape 28 as one composite seismic-trace signal, that is, as one inverse power weighted, vertically stacked seismic trace.

Inverse power weighting and vertical stacking is done in real time. That is, the average time to weight and sum one of the seismic-trace signal samples, which comprises the incoming seismic-trace signal, is less than the time required to input that sample from the analog-to-digital converter circuit 14. Hence, the inverse power weighting and vertical stacking program runs while analog-to-digital conversion and tape interrupts occur.

As higher and higher exponents are selected, the greater and greater can be the real-time requirement for execution of the inverse power weighting and vertical stacking program. In the preferred embodiment of the recorder 10, all calculations are performed on a real-time basis between the times that seismic-trace signal samples are read (on a buffered basis). Therefore, the execution time requirement must be shorter than the sampling rate, in the illustrated case two milliseconds, which imposes a constraint on the size of the exponent.

The microcomputer circuit 18 is required to perform several sophisticated data processing techniques. In order to accomplish such data processing techniques, the basic data processing capabilities of a 1802 microprocessor manufactured by Motorola, Inc. were enhanced with a 9511 arithmetic processing unit manufactured by Advanced Micro Devices, Inc. as a preferred implementation of the microcomputer circuit 18.

The 9511 is a medium speed arithmetic processing unit. Extensive use is made of the 9511 arithmetic processing unit during inverse power weighting and vertical stacking in accordance with Equation (18). The 9511 arithmetic processing unit works independently of the 1802 microprocessor and is treated as a peripheral device from the system's point of view.

The 9511 arithmetic processing unit is capable of both fixed and floating point arithmetic as well as trigonometric operations. Fixed points operands can be represented in either single (16-bit operands) or double (32-bit operands) precision and are represented as binary, two's complement values. Floating point operands are expressed by a 24-bit mantissa (fractional) value which is right justified in the 32-bit field. The exponent is expressed in two's complement 7-bit value. The most significant bit is the sign of the mantissa (0=positive, 1=negative).

The user interface to the 9511 arithmetic processing unit includes access to an eight-level, 16-bit wide data stack. When using double precision fixed point or floating point data formats, the data stack can be thought of as a four-level, 32-bit wide stack. Data is written onto the stack eight bits at a time with the least significant byte first. Data is removed from the stack in reverse byte order (most significant byte first). Data is entered onto the stack in multiples of the number of bytes appropriate to the chosen data format. The synchronization between the 1802 microprocessor and the 9511 arithmetic processing unit is made by sending the 9511 completion signal to the first external flag of the 1802 (EF1). A brief summary of the commands executed within the 9511 arithmetic processing unit for inverse power weighting and vertical stacking is given in Table 1.

TABLE 1

9511 Command Summary

| Command Mnemonic | Clock* Cycles | Command Description** |
|---|---|---|
| FADD | 56–350 | Adds TOS to NOS and Pop Stack |
| FSUB | 58–352 | Subtracts TOS from NOS and Pop |
| FMUL | 168 | Multiplies NOS by TOS and Pop |
| FDIV | 171 | Divides NOS by TOS and Pop |
| FLTS | 98–186 | Convert Single TOS to Floating |
| PTOF | 20 | Push Floating Pt. TOS to NOS (roll down) |
| POPF | 12 | Pop Floating Pt. from TOS (roll up) |
| XCHS | 18 | Exchange Single TOS and NOS |
| XCHF | 26 | Exchange Floating Pt. TOS and NOS |

*The clock is 3 MHz.
**NOS and TOS stand for "Next on Stack" and "Top of Stack."

FIGS. 3A through 3L illustrate a flow chart of the inverse power weighting and vertical stacking method of the invention as implemented by means of the 1802 microprocessor and the 9511 arithmetic processing unit. FIGS. 3A through 3D show the steps executed by the 1802 microprocessor in connection with inverse power weighting and vertically stacking seismic-trace signals. The steps executed by the 9511 arithmetic processing unit for calculating and applying the weighting values to the seismic-trace signals and vertically stacking the weighted signals in order to produce a composite seismic-trace signal appear in FIGS. 3E through 3L.

Figure 3A:
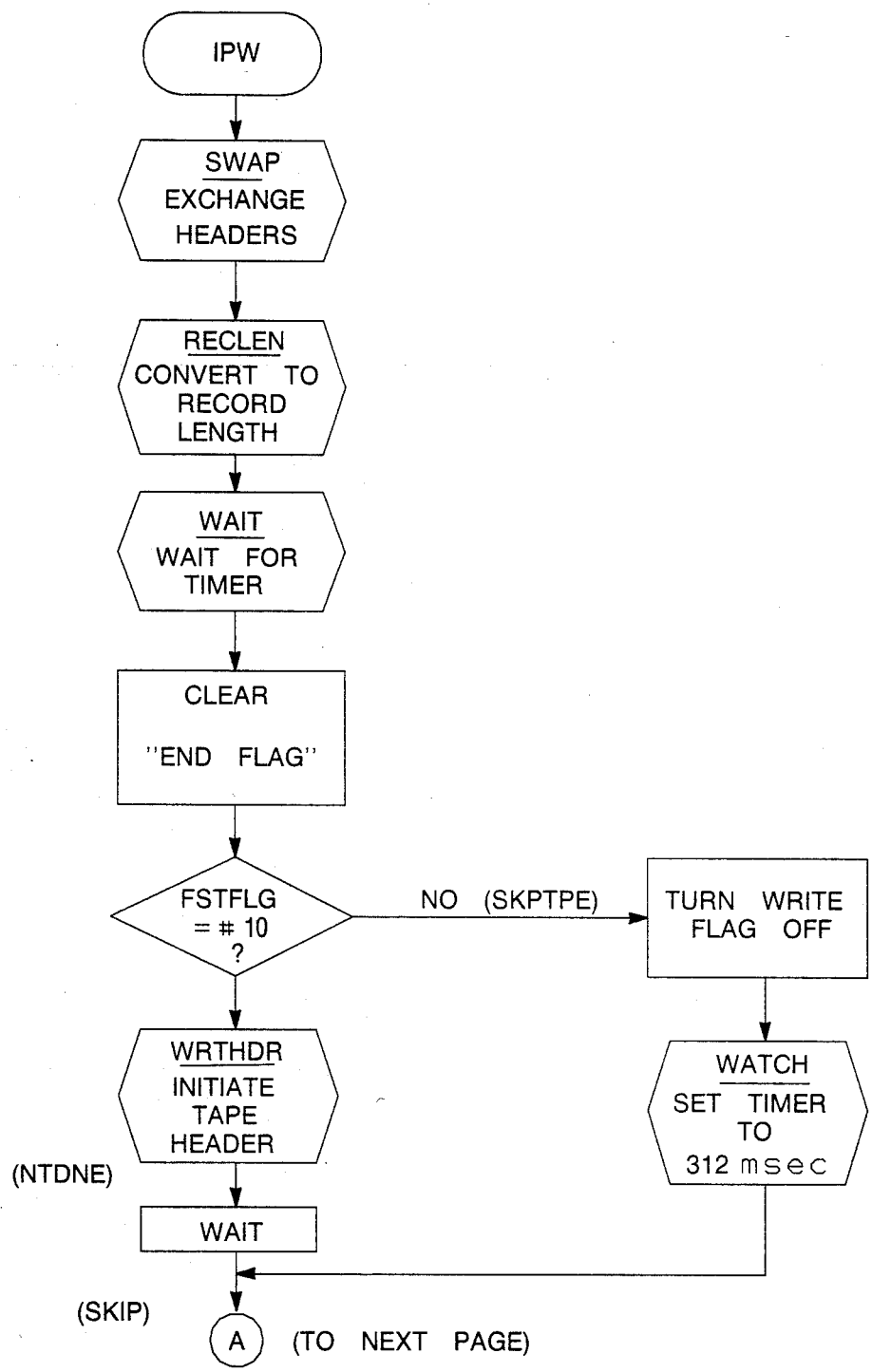
Figure 3B:
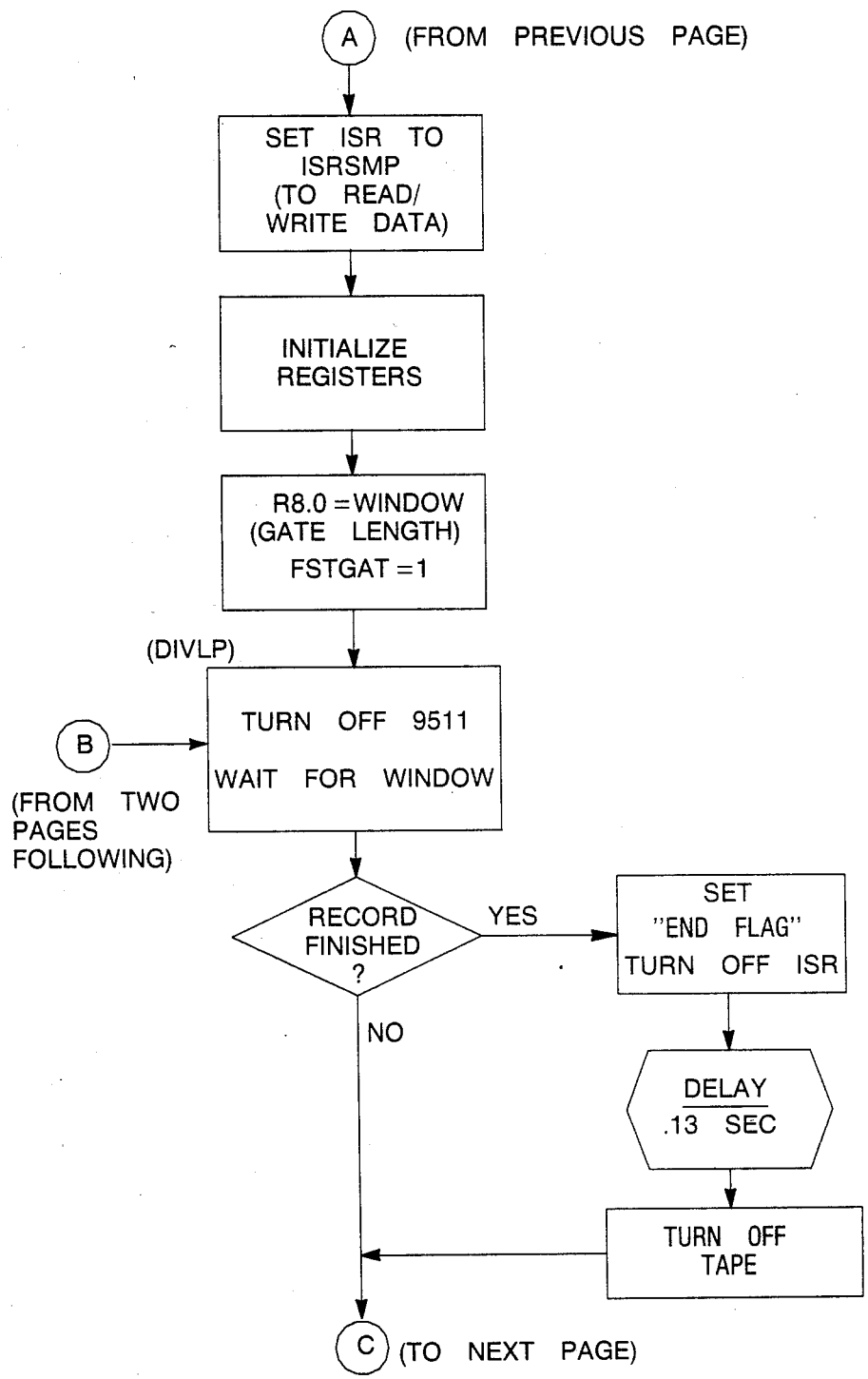
Figure 3C:
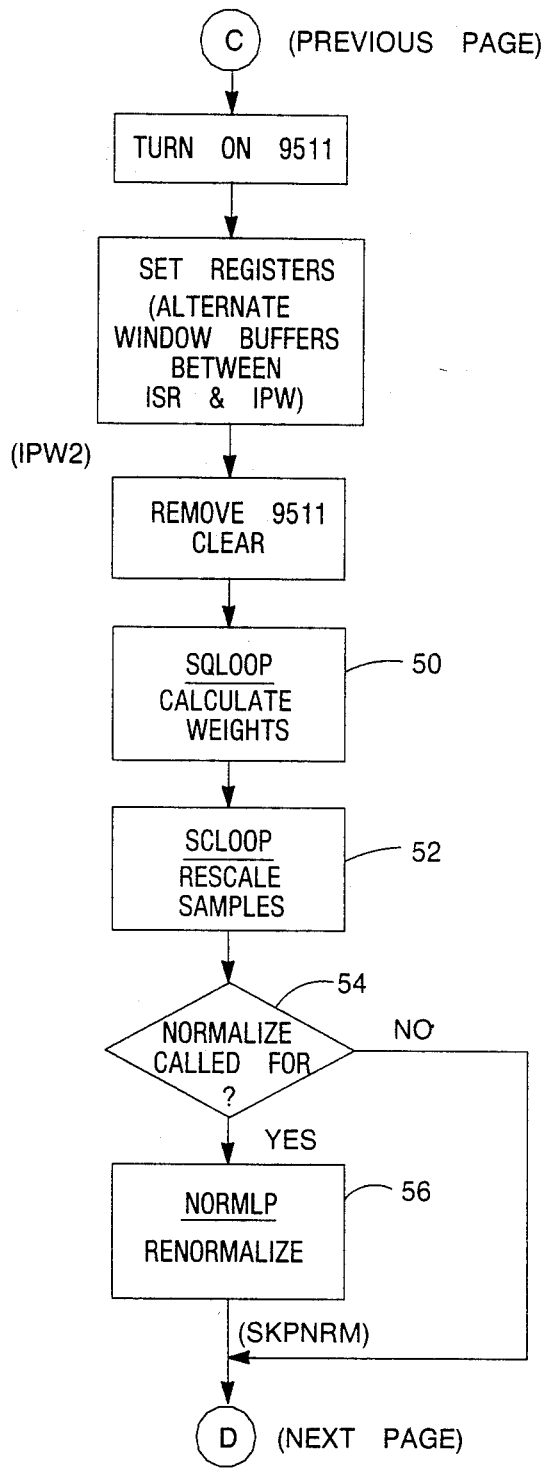
Figure 3D:
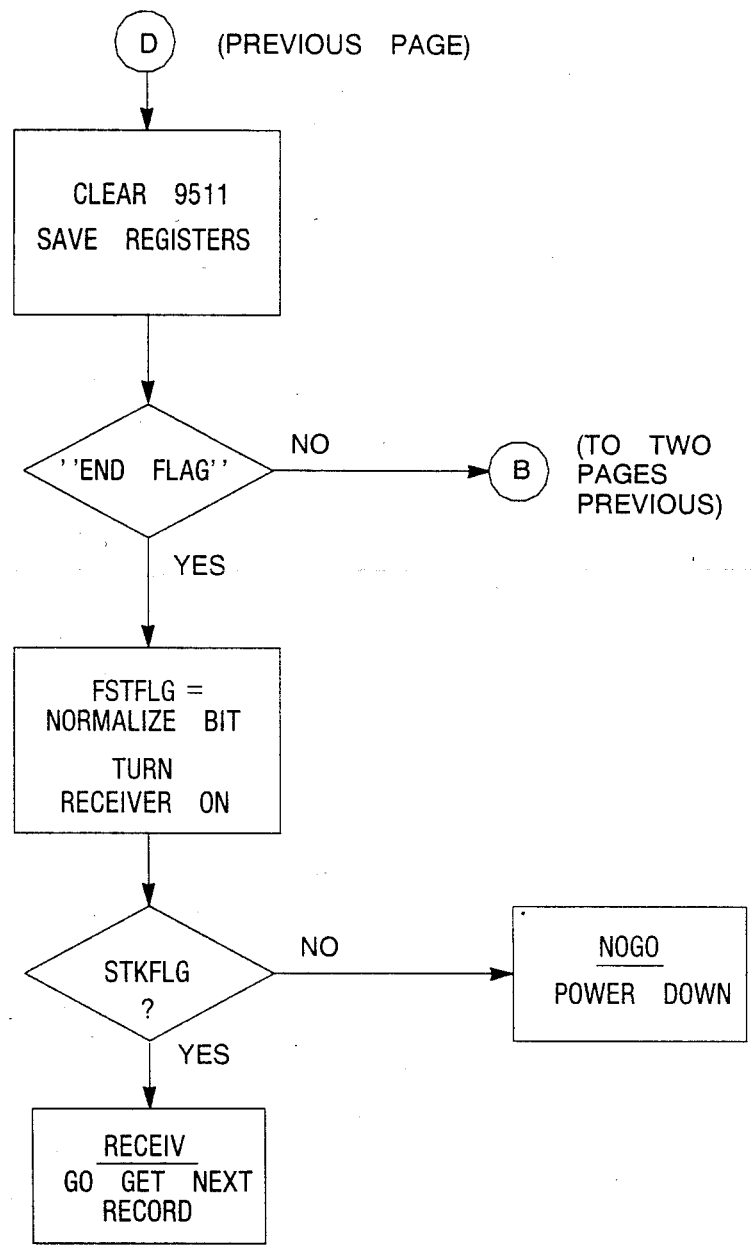
Figure 3E:
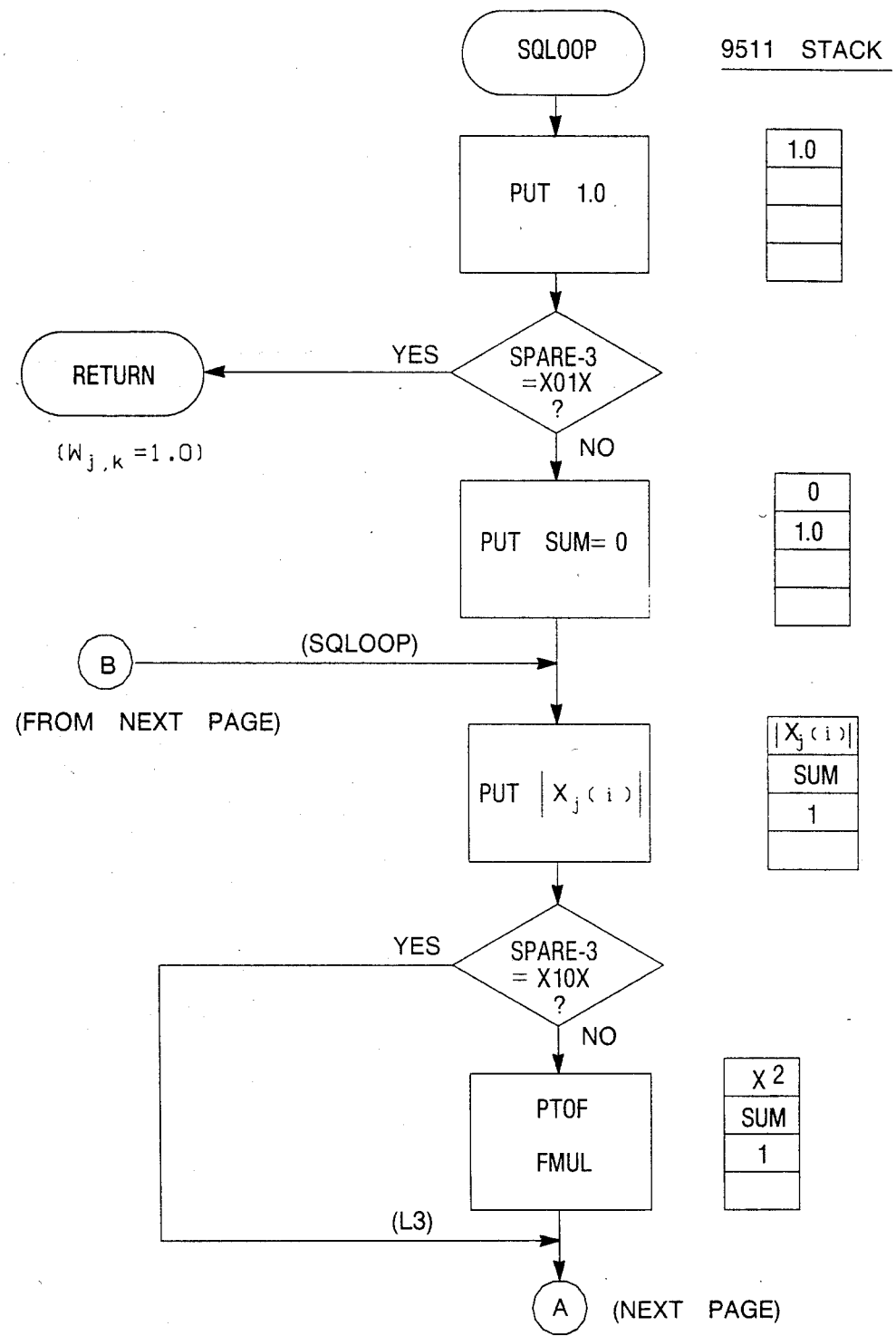
Figure 3F:
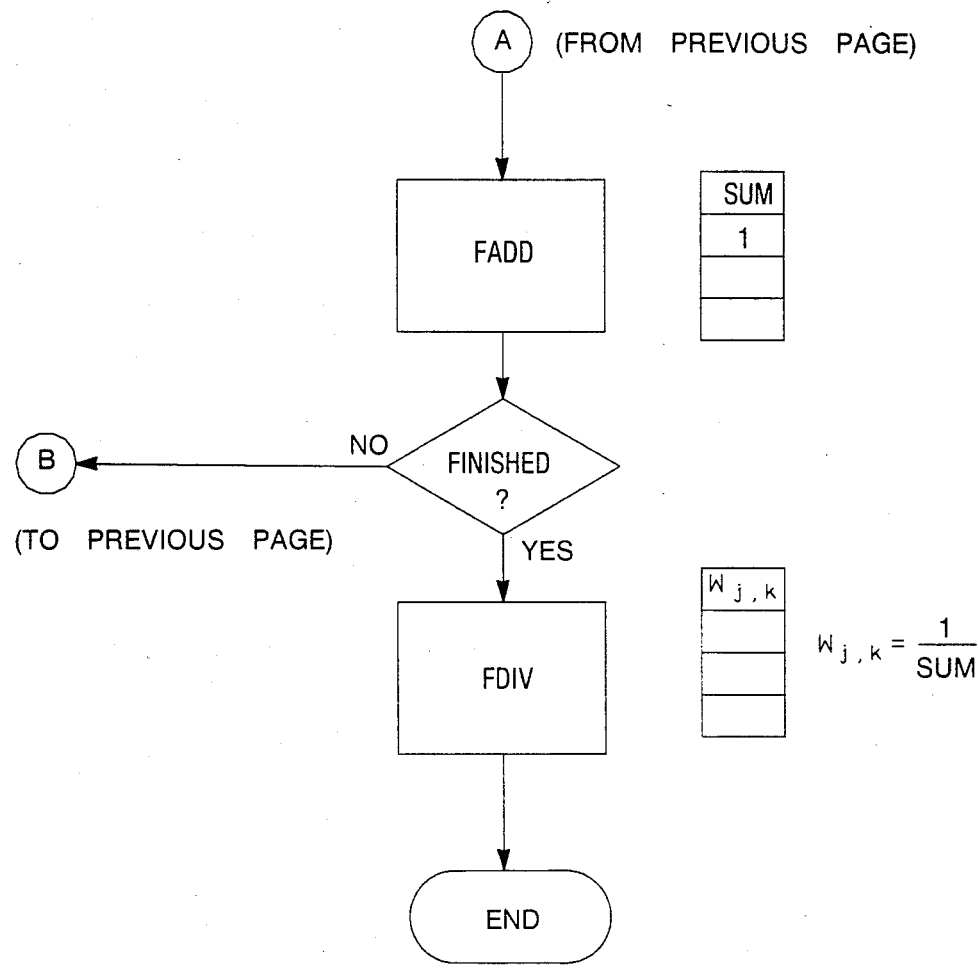
Figure 3G:
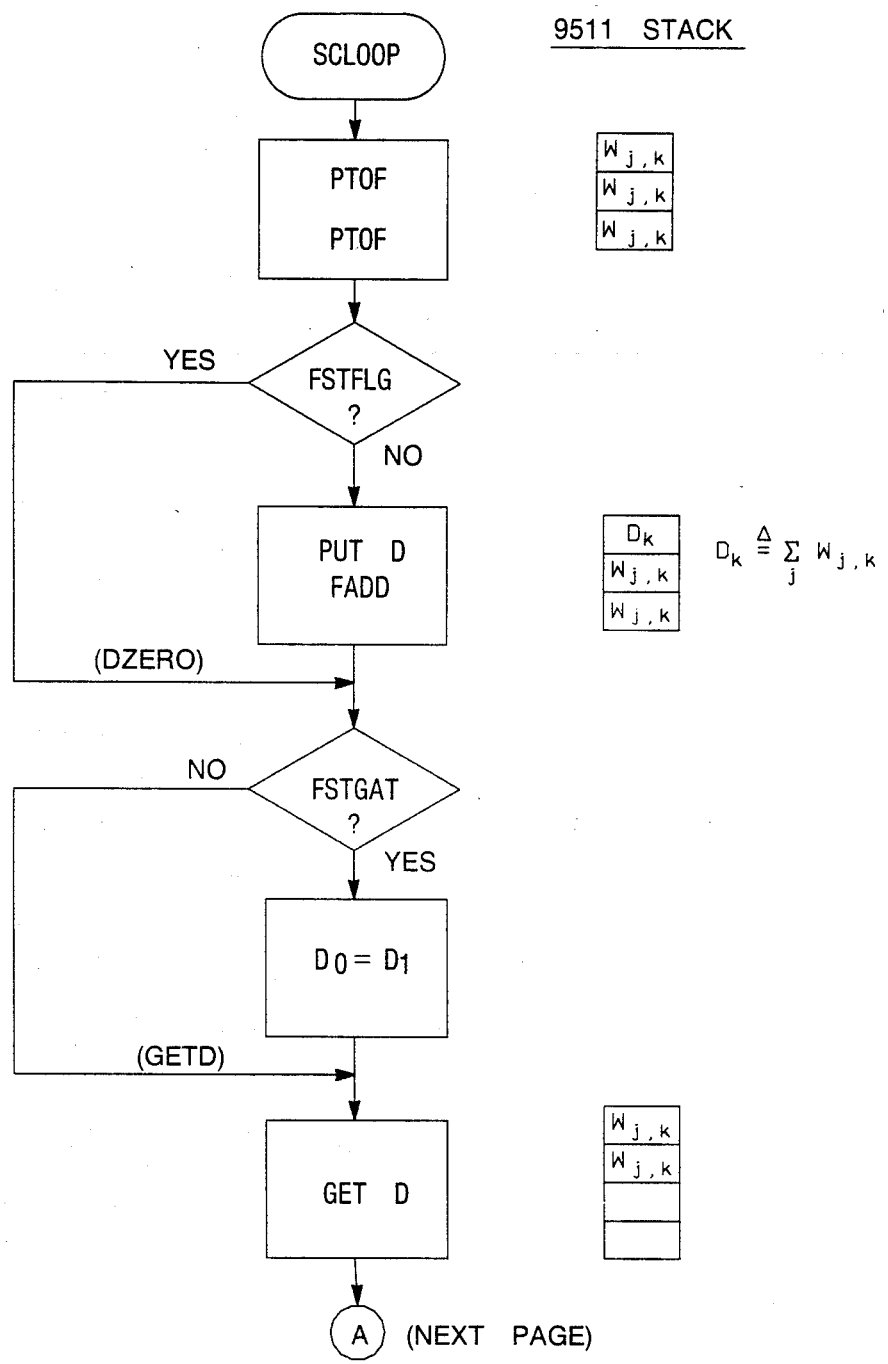
Figure 3H:
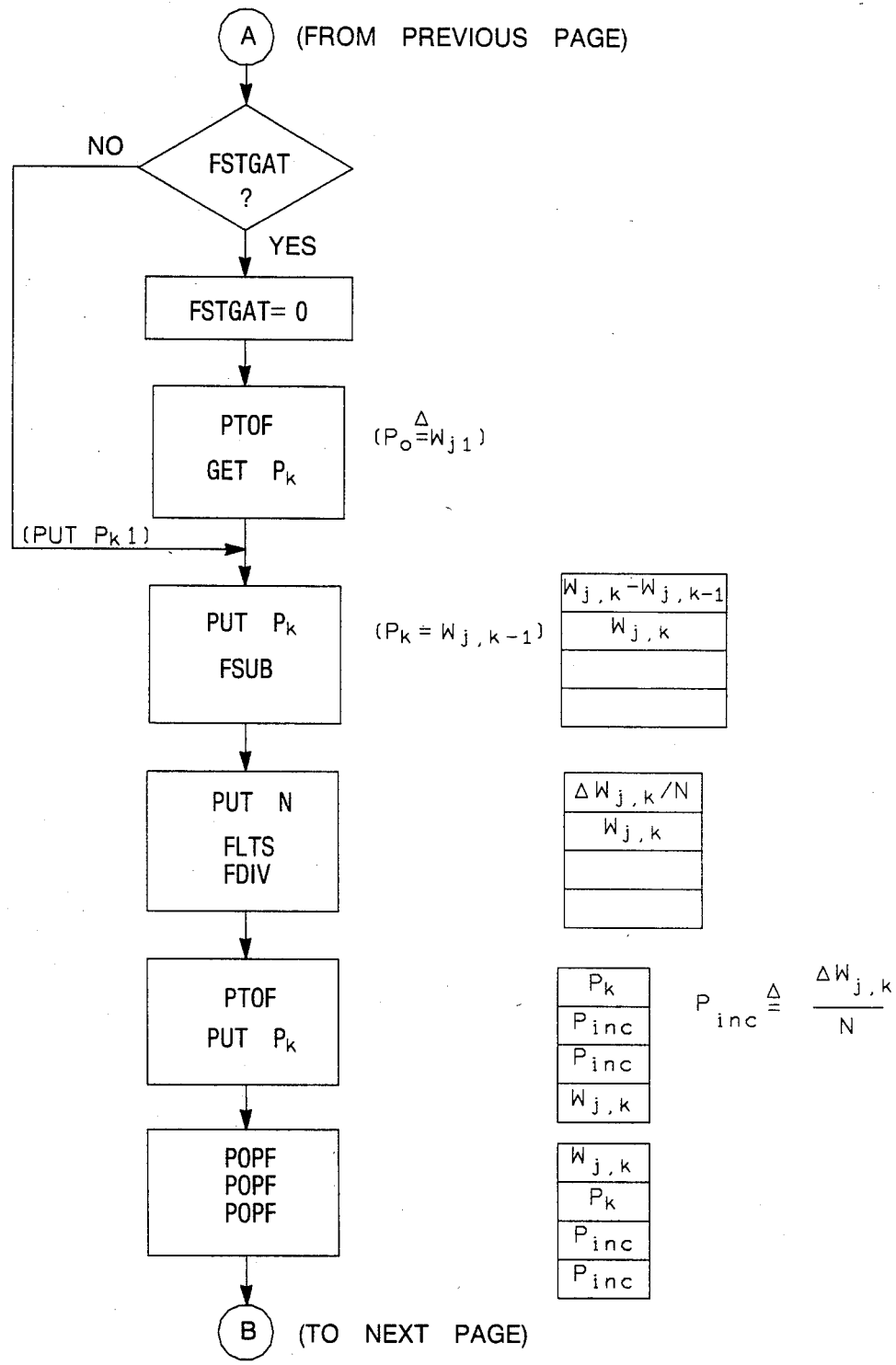
Figure 31:
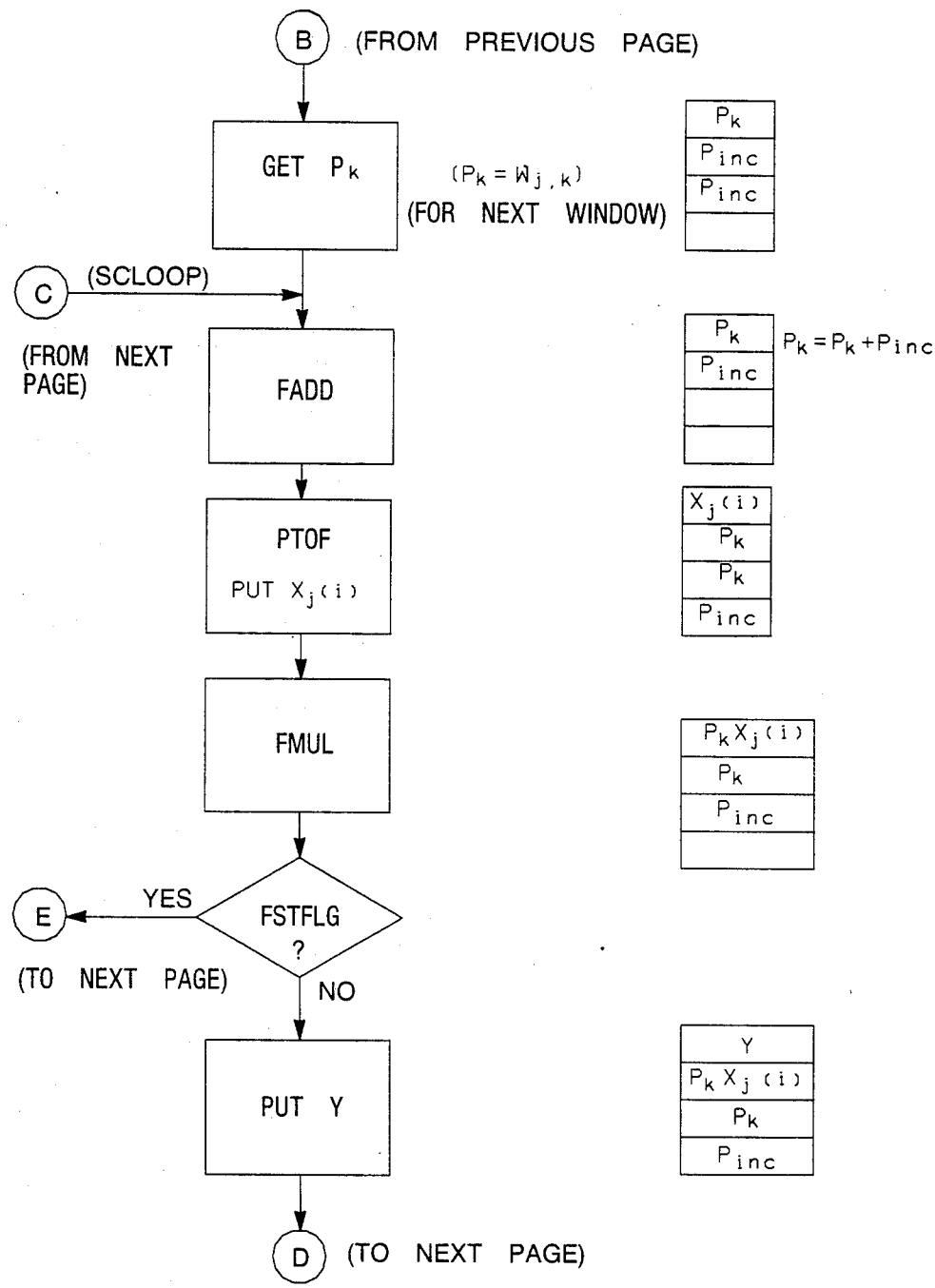
Figure 3J:
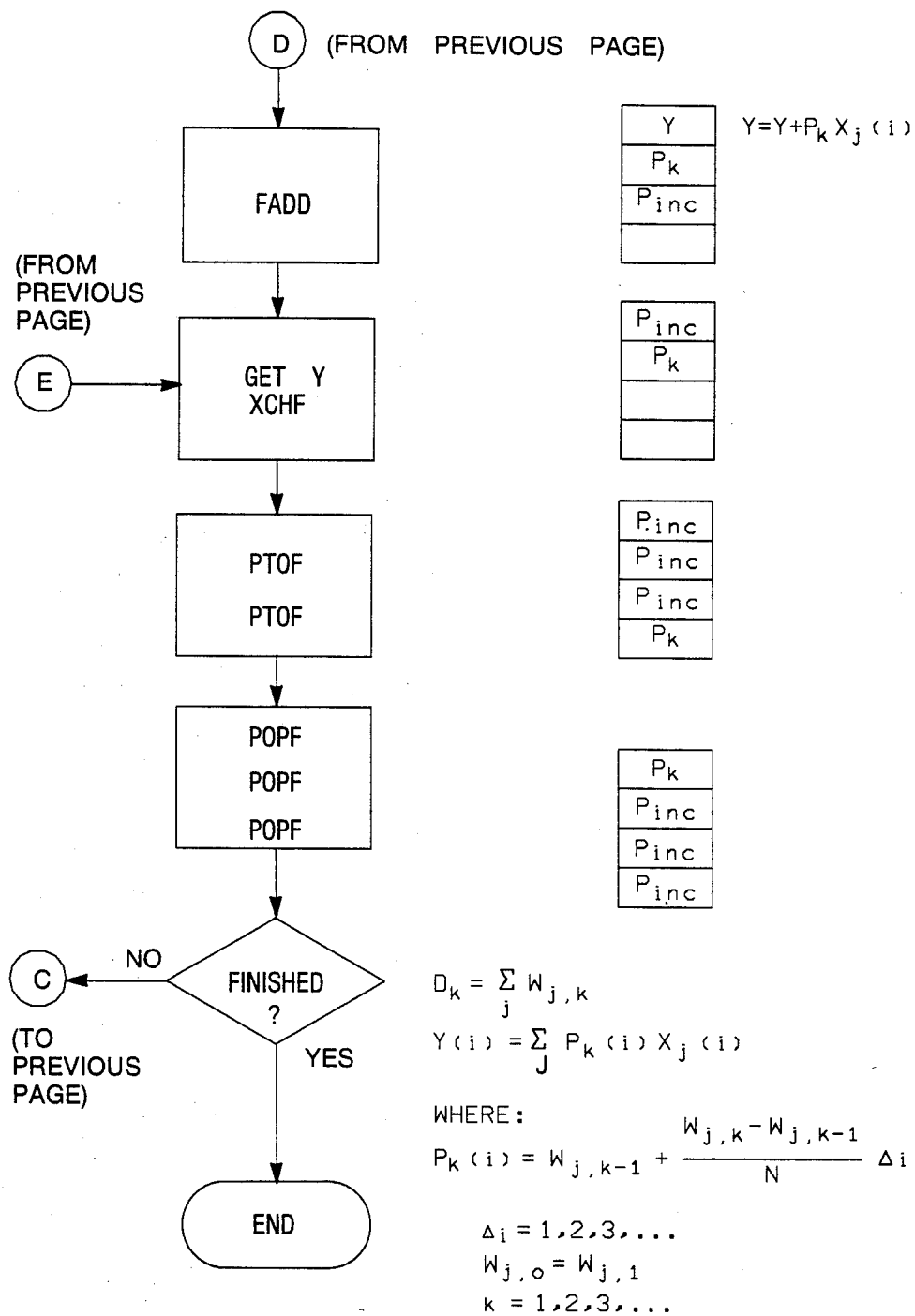
Figure 3K:
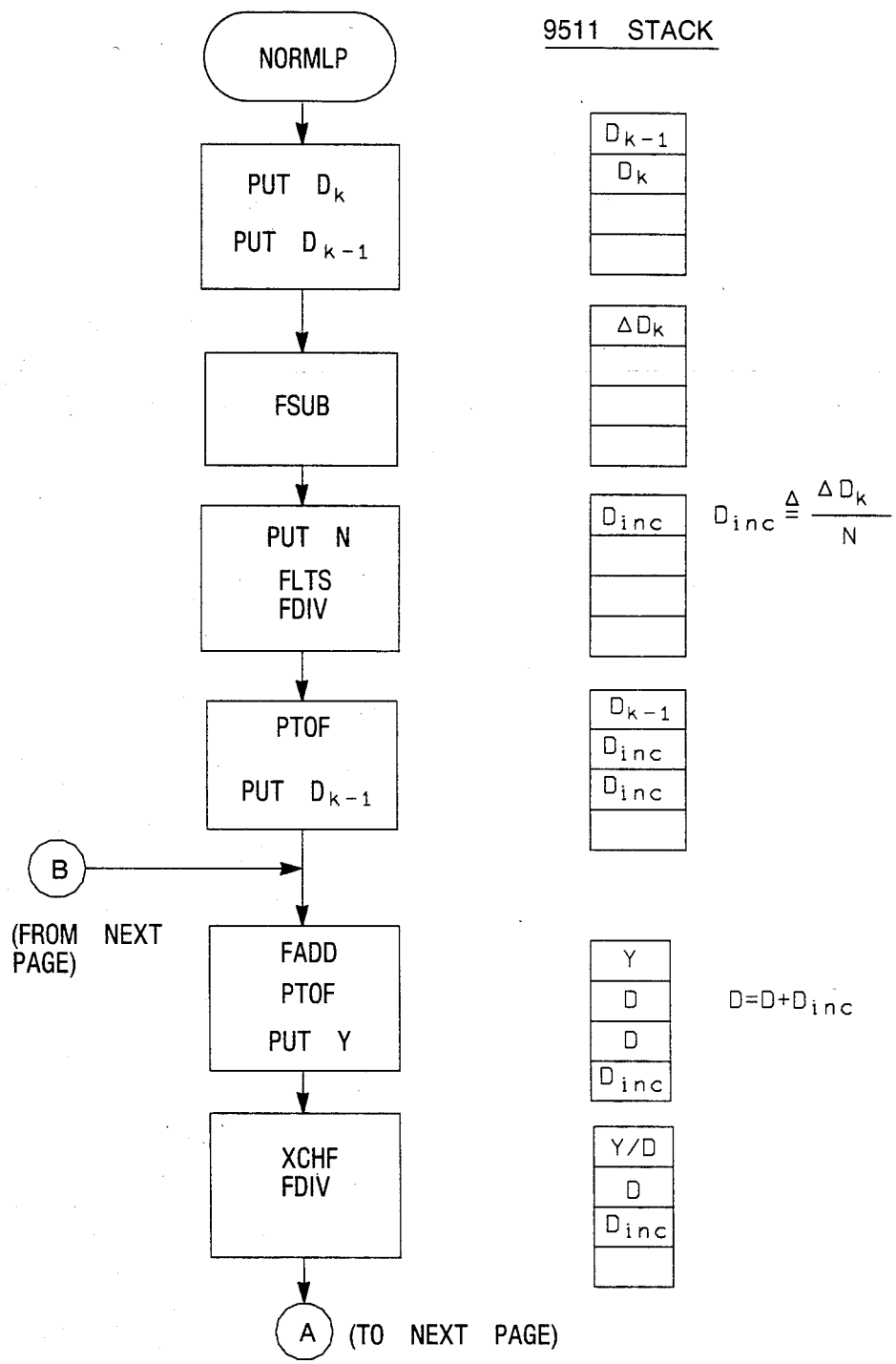
Figure 3L:
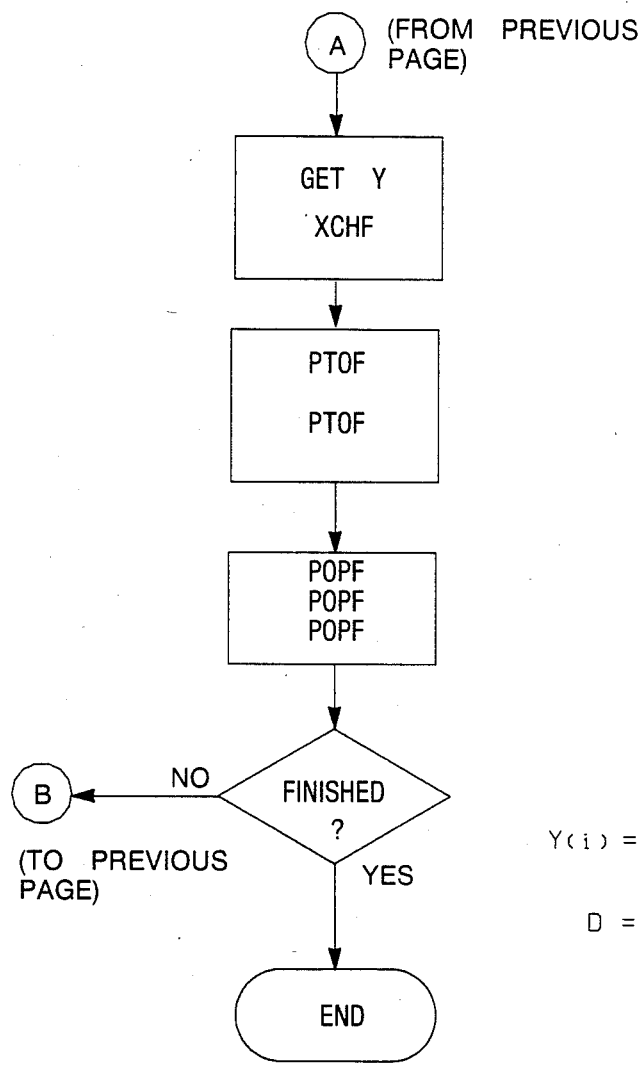
Figure 12A:
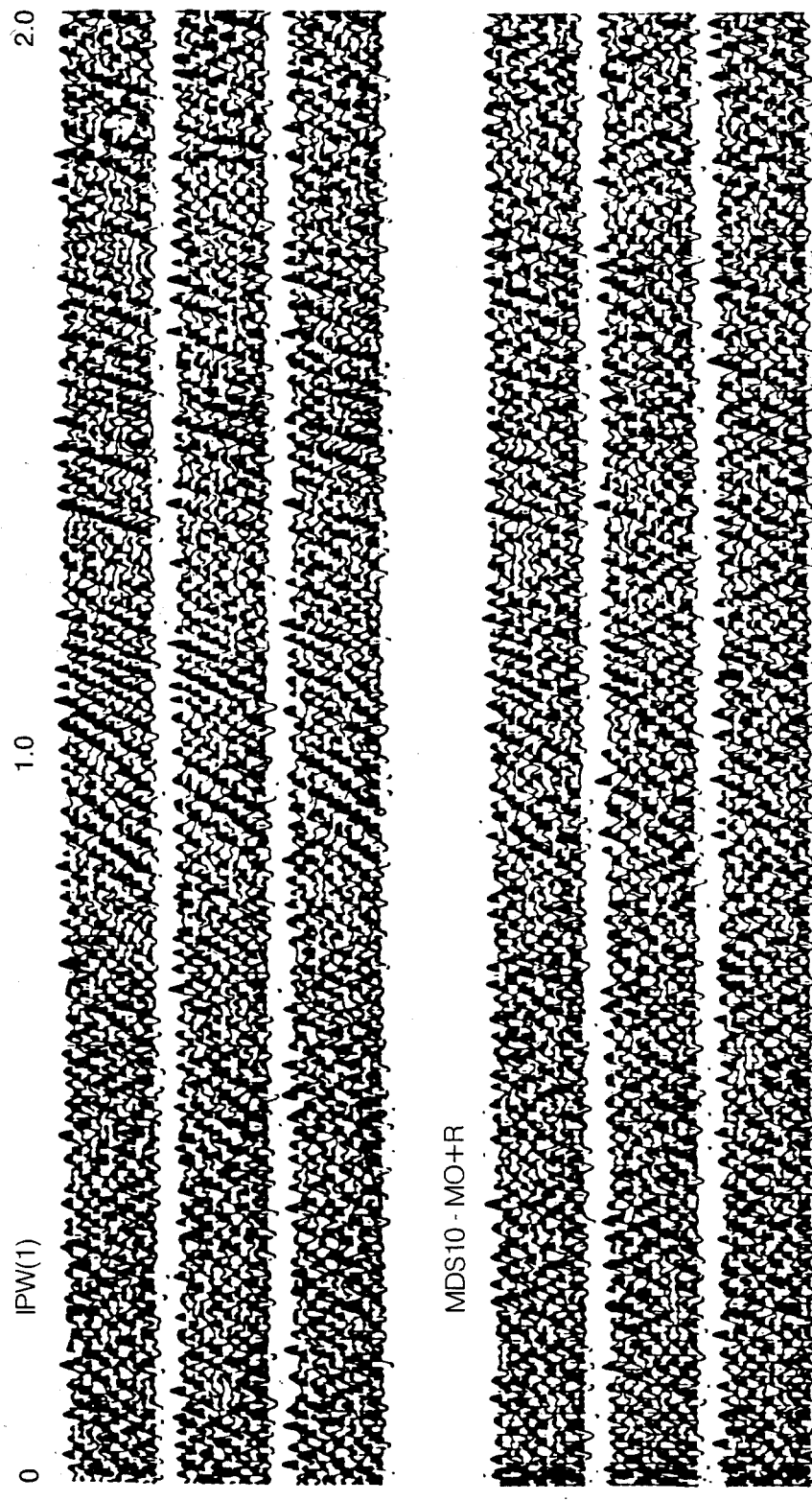

Considered in more detail, the 1802 microprocessor calls the 9511 arithmetic processing unit at step 50 in FIG. 3C, and the 9511 executes the program instructions needed to carry out the steps 50, 52, 54, and 56 in FIG. 3C. FIGS. 3E through 3L illustrate the steps 50, 52, 54, and 56 in detail and provide a picture of the 9511 arithmetic processing unit data stack, or registers, and the data contained in the stack as each step is executed by the 9511.

When the recorder 10 is radioed in the inverse power weighting and vertical stacking mode (selectable from the radio control means, not shown), power is constantly maintained (controlled by a stack flag) to preserve the composite seismic-trace signal. When first initiated, the stack flag is set, and the inverse power weighting and vertical stacking program is initialized. The incoming seismic-trace signal samples are then inverse power weighted and vertically stacked as shown in FIGS. 3A through 3L. When normalization is called for, the last incoming seismic-trace signal samples are inverse power weighted and vertically stacked, normalization is performed, and a first flag is set to indicate the composite seismic-trace signal is normalized. The composite seismic-trace signal is held and then recorded on the tape 28 as the next sweep begins and the first incoming seismic-trace signal of the next sweep is read. The recording of data, that is, the composite seismic-trace signal, on the tape 28 and initialization of a new stack occur whenever the stack has been previously normalized (as indicated by the first flag). Whenever a nontest call is made and the recorder 10 is not radioed by the radio control means (not shown), the composite seismic-trace signal is recorded on the tape 28 (if it had been normalized), and the recorder is then powered down. Whenever the recorder 10 is powered down, the stack flag is reset, and first flag is set.

As higher and higher exponents are selected, the greater and greater is the dynamic range requirement of the 9511 arithmetic processing unit for execution of the inverse power weighting and vertical stacking program. Therefore, the dynamic range requirement of the 9511 arithmetic processing unit can impose a constraint on the size of the exponent.

A prototype of the recorder 10 in accordance with the invention has been tested in the field. The testing comprised inverse power weighting and vertically stacking and then recording acquired vibroseis seismic-trace data. A side-by-side comparison was made with composited vibroseis seismic-trace data acquired by means of an MDS-10 digital field recorder manufactured by Geosource, Inc. of Houston, Tex. The recorder 10 proved to be highly effective in suppressing the high amplitude burst noise typically present in an environment with road traffic.

The purpose of the test was to evaluate the recorder 10 under field conditions during vibroseis seismic prospecting. This was a two-part test. Part A was taken under burst noise conditions along a road with vibrators at a near range (1200 feet). Part B was identical to Part A except the vibrators were at a far range (6200 feet).

These tests were taken north of Midland, Tex. For comparison, a 96-channel MDS-10 with mantissa-only (MO) and editor (high signal reject (R)) recording capabilities added on was also used to acquire the vibroseis seismic-trace data.

The MDS-10 cables were laid out in their normal setup with seismometers connected into MDS-10 channels 1 through 24. A second set of seismometers was laid out along side the seismometers connected to MDS-10 channels 13 through 24. This second set of seismometers was connected into the twelve prototypes of recorder 10 constructed in accordance with the invention. The seismometer group length was 200 feet and the group spacing was 100 feet.

Vibroseis seismic-trace data was taken with both the MDS-10 and recorder 10 set up to start simultaneously. A radio control circuit was used by the observer to start the recording sequence. The radio control circuit started the recorder 10 in the MDS-10 recording truck, which, in turn, started the MDS-10 via a relay closure switch included in the recorder 10. A separate recorder 10 was used to record the first few pilot signals for cross-correlating the vibroseis seismic-trace data. The vibroseis seismic-trace data was recorded at two milliseconds with a 60 Hz notch filter in and low-cut filter out. The record length was 17 seconds for the MDS-10 and 19 seconds for the recorder 10. Each record was taken by summing ten sweeps per vibration point.

Three vibrators were used together with 14-second sweeps going from 20 Hz to 100 Hz. Three recordings were taken for each test with the vibrators moving through three consecutive vibration points.

Part A was taken on a road in a quiet prospect area while the vibrators moved along from 1100 to 1300 feet further up the profile survey line from the near seismometer group. Quiet recordings with true amplitude summation were taken in order to have an absolute reference, and then several recordings were taken in a traffic noise condition created by driving six cable trucks up and down the seismometer spread while recording the vibroseis seismic-trace data. Table A gives a description of the various tests that were taken during Part A.

TABLE A

| Test | Condition | Improved Recorder 10 (Exponent) | MDS-10 |
|---|---|---|---|
| 1 | Quiet | 0 | TA (True Amplitude) |
| 2 | Quiet | 2 | MO+R (Mantissa Only plus Reject) |
| 3 | Traffic | 0 | TA |
| 4 | Traffic | 1 | MO+R |
| 5 | Traffic | 2 | MO+R |
| 6 | Traffic | 2 | MO |
| 7 | Traffic | 2 | R |

Part B was set up identically as in Part A except the vibrators moved along from 6100 to 6300 feet from the near seismometer group. Three tests were taken in the second part with the first being under quiet conditions, again to establish a reference. The description of the various tests conducted during Part B are shown in Table B.

TABLE B

| Test | Condition | Improved Recorder 10 (Exponent) | MDS-10 |
|---|---|---|---|
| 8 | Quiet | 2 | MO+R |
| 9 | Traffic | 1 | MO+R |
| 10 | Traffic | 2 | MO+R |

The tapes 28 from the recorder 10 were transcribed on a Perkin-Elmer computer. The output of the transcriber was input directly into a program for performing cross-correlation.

The MDS-10 seismic-trace data was demultiplexed and cross-correlated on a Phoenix system manufactured by Seismograph Service Corporation of Tulsa, Okla. A program was then applied to acquire the same twelve corresponding channels that were recorded with the recorder 10.

Programs were then used to separately combine the seismic-trace data from each of the two digital field recorders (MDS-10 and recorder 10). Finally, a program was applied to prewhiten the seismic-trace data, followed by application of a program to taper down the high frequency side of the data to reduce some of the data ringing. Plots were produced both before (using a program for trace scaling) and after prewhitening and tapering.

The results shown in FIGS. 4A through 13A were those with the full prewhitening and tapering processing steps applied as discussed above. These show the comparisons based on the full bandwidth of the seismic-trace signals. FIGS. 4B through 13B show the same tests, however, before the prewhitening and tapering effects. This second set of figures shows more clearly the results from a strict signal/noise level perspective.

Part A (Near Range Along Road)

Test 1: (FIG. 4) While maintaining a quiet environment, these three recordings were taken in order to provide a reference for other tests in Part A. Both digital field recorders were set up in their summing modes for stationary noise, that is, true amplitude summation. One of the IPW(0) records of the recorder 10 is missing due to operator error. Both digital field recorders performed equally well.

Test 2: (FIG. 5) A second set of recordings was taken without any traffic noise. Both digital field recorders were set up with their summers for burst noise, that is, the inverse power weighting with exponent two mode, IPW(2), for the recorder 10 and mantissa-only plus reject (MO+R) for the MDS-10. This test was to assure that neither of these noise-rejection summing techniques would greatly degrade the seismic-trace data when no burst noise was present. These records indicate no major disturbance in the seismic-trace data by either digital field recorder.

Test 3: (FIG. 6) Both digital field recorders were set up in true amplitude summation while cable trucks were driven up and down the road along side the seismometer spread to produce traffic burst noise. The effect of this type of noise on seismic-trace data is apparent when compared to the results of the previous tests. Traffic noise was maintained also during the other tests in this part. These results indicate clearly how seismic-trace data acquired by both digital field recorders is greatly degraded when using a true amplitude summing technique on burst noise.

Test 4: (FIG. 7) In this test the MDS-10 was set up in its normal summing mode, that is, mantissa-only plus reject (MO+R). The recorder 10 had selected the inverse power weighting with exponent one mode, IPW(1). The results from this figure show the dramatic improvement that can be achieved by these more elaborate summing techniques. The two digital field recorders appear to enhance the seismic-trace data equally.

Test 5: (FIG. 8) While leaving the MDS-10 set up in its MO+R mode, the recorder 10 was switched over to the exponent two mode, IPW(2). Even further improvements for the seismic-trace data acquired by the recorder 10 are in evidence. The background noise before the first breaks is lower, and the deep reflection events display more coherency in the seismic-trace data. IPW(2) is the better technique in this case.

Test 6: (FIG. 9) Now, while leaving the recorder 10 in the IPW(2) mode, the MDS-10 was changed to its mantissa-only (MO) mode. Note that only two of the three recordings were obtained for the recorder 10. This was again due to operator error. Surprisingly, with regard to the MDS-10, the mantissa-only mode performed only slightly better than the true amplitude summation mode on seismic-trace data with traffic noise. This suggests that for this prospect area, recorder, and noise, the bulk of the noise reduction for the MDS-10 is accomplished by the reject (R) circuit. The next test bears this out.

Test 7: (FIG. 10) The recorder 10 again was left in the IPW(2) mode, while the MDS-10 was changed to use the reject (R) mode only. As expected from the previous test, the noise reduction in the MDS-10 in this environment is accomplished primarily by its reject circuit and not by its mantissa-only mode.

Part B (Far Range Along Road)

Test 8: (FIG. 11) In this test the MDS-10 was left in its MO+R mode, while the recorder 10 was switched to the IPW(2) mode. These recordings were taken with the vibration points moved about a mile further up the profile survey line from the seismometers and no traffic noise present. Again, this was to establish a reference for the other tests in this part. Both digital field recorders performed equally well.

Test 9: (FIG. 12) With the presence, once again, of road traffic, the recorder 10 was switched to the exponent one, IPW(1), mode. It can be seen that even using only the exponent one mode for the recorder 10, the seismic-trace data has a larger signal-to-noise ratio than that taken by the MDS-10.

Test 10: (FIG. 13) The superiority of the recorder 10 is even more pronounced with the exponent two mode, IPW(2). The results of this test clearly show a dramatic improvement of the seismic-trace data over the best mode of the MDS-10, MO+R. The MDS-10 did not perform as well with the far range tests as with the near range tests.

The field test points out two problems associated with using a thresholding noise rejector such as implemented in the MDS-10. First, the threshold is based only upon the signal level from one channel (usually one of the near channels) and, therefore, degrades performance when applied to other channels where the threshold may need to be set differently. Secondly, in some prospect areas where burst noise is always present, and a quiet recording cannot be obtained, it becomes difficult, if not impossible, to determine a threshold to be used. With the recorder 10, each channel is independent and no thresholding is necessary.

While the recorder 10 was still set up, fifteen records of individual sweeps were taken under the same road traffic conditions. This provided the opportunity for evaluating various inverse power weighting modes at a later time under these realistic conditions. Specifically, presented here are the results of varying the parameters of the inverse power weighting and vertical stacking method of the invention in order to evaluate the sensitivity of its effectiveness to the selected exponent and window length.

Figure 14:
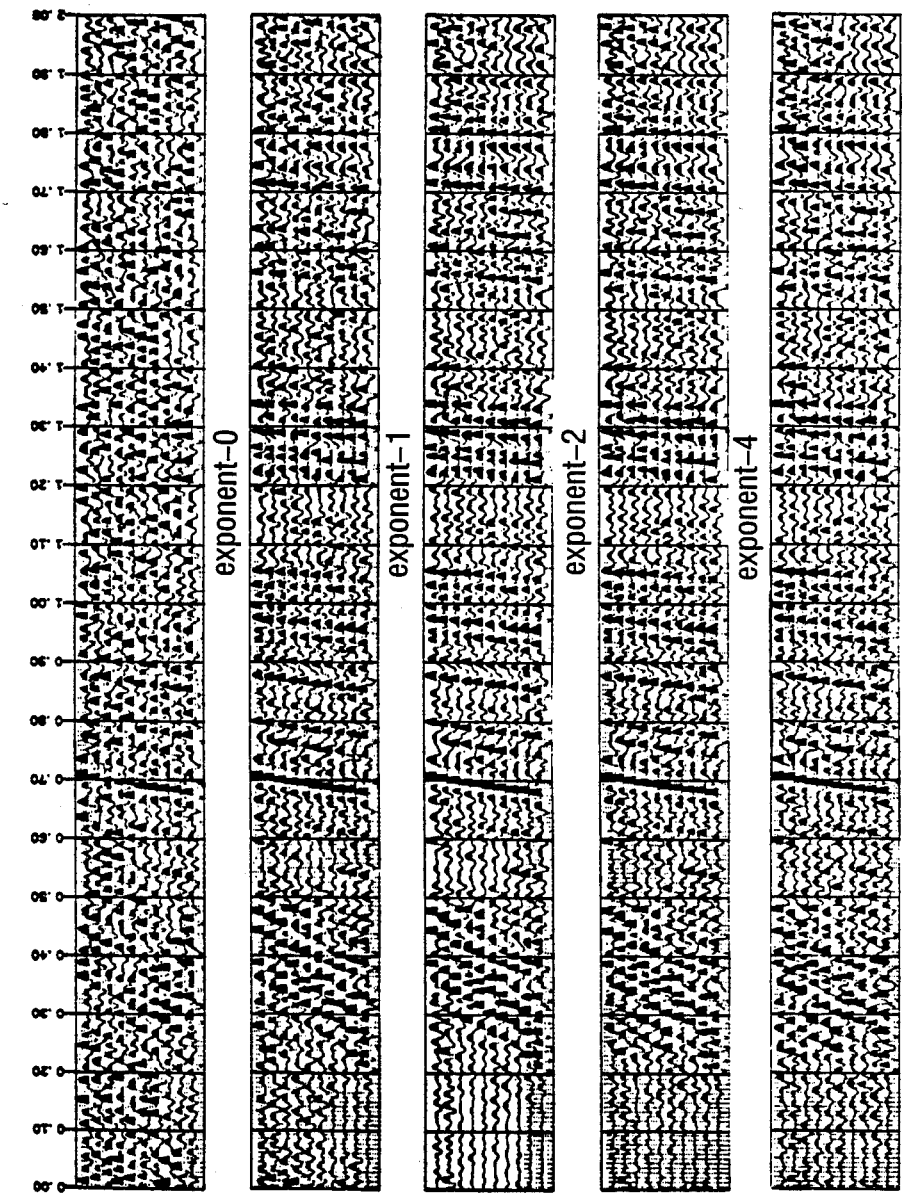
FIG. 14 is a seismogram which illustrates the effect of varying the inverse power weighting exponent in accordance with the invention.

FIG. 14 shows the results of varying the exponent from zero to eight (exponent zero being equivalent to true amplitude summation). In each panel a window length of 500 milliseconds was used. As expected from Equation (18), an exponent of one attenuates the burst noise, thereby providing an improved result over no weighting (using exponent zero). Likewise, using exponent two provided an even more pronounced improvement. Furthermore, it can be concluded that the average true earth response seismic signal level was slightly lower than the ambient noise level, since the results using exponent four cannot be distinguished from those using exponent two. This is because the lowest frequency of the seismic source was 20 Hz, that is, above the ground roll excitation frequency. Furthermore, a slightly lower seismic-trace data quality is produced with the exponent eight. Comparing these results to FIG. 1C suggests that the average signal-to-noise ratio was in the range of −10 to 0 dB.

The effect of varying the window length used in connection with the inverse power weighting and vertical stacking method of the invention is shown in FIG. 15 (the window length referred to here is the length of the component seismic-trace signal used to estimate the signal-plus-noise level required for the weighting values). The exponent two was applied to the individual recordings using window lengths of 500 and 50 milliseconds. While a loss in performance can be observed in the recording using the shorter window length, the loss is very slight.

In general, a small window length is desirable in order to adapt to as short a noise burst as possible. However, the window length must be sufficiently long in order to assure a statistically reliable estimate of the signal-plus-noise level.

The results of varying both of these parameters, exponent and window length, indicates that the performance of the inverse power weighting and vertical stacking method of the invention is not particularly sensitive to parameter selection. An exponent of two to four would be recommended, at least for the above-described test conditions.

The field test demonstrated that the recorder 10 is highly effective in suppressing high amplitude burst noise, as is typically present in an environment with road traffic. The exponent two, IPW(2), mode of the recorder 10 specifically appeared to provide better results than that provided by the MDS-10. This improvement is especially significant at ranges where the reject circuit's threshold level for the MDS-10 was not determined. Within the recorder 10, no quiet recordings are required to set up thresholds. Furthermore, unlike the MDS-10, in which the threshold for one channel preferably serves as the threshold for other channels in order to facilitate deployment, the recorder 10 is a channel independent device, that is, an exponent can be individually selected for each channel.

The recorder 10 in accordance with the invention is seen to be superior to the MDS-10 for recording vibroseis seismic-trace data. The absence of such noise as 60 Hz line pickup and channel cross-talk in the master cable of the MDS-10, a very serious problem when low level surface seismic sources, such as a vibrator, are used is a further advantage of the recorder 10 over the MDS-10.

While the invention has been described with a certain degree of particularity, it is manifest that many changes can be made in the details of construction and the arrangement of components without departing from the spirit and scope of this disclosure. It is understood that the invention is not limited to the exemplified embodiments set forth herein but is to be limited only by the scope of the appended claims, including the full range of equivalency to which each element thereof is entitled.

What is claimed is:

1. A method for processing incoming seismic-trace signals acquired during seismic prospecting utilizing plural initiations of a seismic source, comprising the steps of:

improving the signal to noise ratio in incoming seismic trace signals by selecting an exponent from a group of exponents including 0, 1, 2, 4 and 8, for use with a remotely deployed field recorder for inverse power weighting the incoming seismic trace signals based on the ratio of the expected level of true earth response seismic signals, which can include reflections, refractions or ground roll, and the expected level of ambient noise, which can include burst noise;

dividing each incoming seismic-trace signal into a series of component seismic-trace signals each within a time window of a predetermined length, each component seismic-trace signal comprised of samples of the incoming seismic-trace signal;

calculating a respective weighting value for each respective component seismic-trace signal based on the selected exponent;

applying the respective weighting values to the respective component seismic-trace signals; and summing the corresponding weighted component seismic-trace signals from plural initiations of the seismic source for forming a composite seismic-trace signal.

2. The method of claim 1 wherein the respective weighting values equal the inverse of the sum of the magnitudes of the samples, which comprise the respective composite seismic-trace signals, raised to the selected exponent.

3. The method of claim 1 wherein the step of applying the respective weighting values to the respective component seismic-trace signals includes applying a weighting value based on a linear interpolation between the weighting value calculated for the previous window, if any, and the weighting value calculated for the current window.

4. The method of claim 1, further comprising the step of normalizing the composite seismic-trace signal based on the sum of the weighting values for the seismic-trace signal samples.

5. The method of claim 1 wherein at least one selected exponent is selected from among exponents 0, 1, 2, 4 and 8.

6. The method of claim 1 wherein at least one selected exponent is selected from among exponents greater than 2.

7. A method for processing incoming seismic-trace signals acquired during seismic prospecting utilizing plural initiations of a seismic source, comprising the steps of:
  improving the signal to noise ratio in incoming seismic trace signals by selecting an exponent from a group of exponents including 0, 1, 2, 4 and 8, for use with a remotely deployed field recorder for inverse power weighting the incoming seismic trace signals based on the ratio of the expected level of true earth response seismic signals, which can include reflections, refractions or ground roll, and the expected level of ambient noise, which can include burst noise;
  dividing each incoming seismic-trace signal into a series of component seismic-trace signals each within a time window of a predetermined length, each component seismic-trace signal comprised of samples of the incoming seismic-trace signal;
  calculating a respective weighting value for each respective component seismic-trace signal based on the selected exponent by raising the magnitude of each sample of the respective component seismic-trace signal to the selected exponent and next performing a summation and then taking the inverse of the result;
  applying the respective weighting values to the respective component seismic-trace signals; and
  summing the corresponding weighted component seismic-trace signals from plural initiations of the seismic source for forming a composite seismic-trace signal.

8. The method of claim 7 wherein the step of applying the respective weighting values to the respective component seismic-trace signals includes applying a weighting value based on a linear interpolation between the weighting value calculated for the previous window, if any, and the weighting value calculated for the current window.

9. The method of claim 7, further comprising the step of normalizing the composite seismic-trace signal based on the sum of the weighting values for the seismic-trace signal samples.

10. The method of claim 7 wherein at least one selected exponent is selected from among exponents 0, 1, 2, 4 and 8.

11. The method of claim 7 wherein at least one selected exponent is selected from among exponents greater than 2.

12. A method for optimizing the signal-to-noise ratio of incoming seismic-trace signals during seismic prospecting utilizing plural initiations of a seismic source, comprising the steps of:
  sampling the incoming seismic-trace signals, thereby forming seismic-trace signal samples;
  digitizing the seismic-trace signal samples;
  selecting an exponent for use in inverse power weighting the digitized seismic-trace signal samples based on the ratio of the expected level of true earth response seismic signal and the expected level of ambient noise, including nonstationary noise; and
  processing the digitized seismic-trace signal samples in accordance with the following equation:

$$Y_i = \frac{\sum_{j=1}^{M} \{W_{j,k-1} + (i - (k-1)N)(W_{j,k} - W_{j,k-1})/N\} X_{i,N(k-1)+j}}{\sum_{j=1}^{M} \{W_{j,k-1} + (i - (k-1)N)(W_{j,k} - W_{j,k-1})/N\}}$$

for $i = 1$ to $NS$ where: $k = \left| \dfrac{i - 1 + N}{N} \right|$ $W_{j,k} = \left[ \sum_{i=kN-N+1}^{kN} |X_{i,j}|^m \right]^{-1}$ for $k = 1$ to $\left| \dfrac{NS + N - 1}{N} \right|$ $W_{j,0} = W_{j,1}$  $m$ = any nonnegative real number $X_{i,j} \triangleq$ i-th input sample of incoming seismic-trace signal from j-th initiation;
$Y_i \triangleq$ i-th output sample of vertically stacked composite seismic-trace signal;
$W_{j,k} \triangleq$ weight of k-th window of j-th initiation;
$N \triangleq$ number of samples of incoming seismic-trace signal per window;
$M \triangleq$ number of initiations;
$NS \triangleq$ number of samples of incoming seismic-trace signal per initiation; and
$m$ is the selected exponent.

13. The method of claim 12 wherein at least one selected exponent is selected from among exponents 0, 1, 2, 4 and 8.

14. The method of claim 12 wherein at least one selected exponent is selected from among exponents greater than 2.

15. A remotely deployed field apparatus for processing incoming seismic-trace signals acquired during seismic prospecting utilizing plural initiations of a seismic source, comprising:
  means for selecting an exponent from a group of exponents including 0, 1, 2, 4 and 8, for improving the signal to noise ratio in incoming seismic trace signals for inverse power weighting the incoming seismic trace signals based on the ratio of the expected level of true earth response seismic signals, which can include reflections, refractions or ground roll, and the expected level of ambient noise which can include burst noise;

means for dividing each incoming seismic-trace signal into a series of component seismic-trace signals each within a time window of a predetermined length, each component seismic-trace signal comprised of samples of the incoming seismic-trace signal;

means for calculating a respective weighting value for each respective component seismic-trace signal based on the selected exponent;

means for applying the respective weighting values to the respective component seismic-trace signals; and means for summing the corresponding weighted component seismic-trace signals from plural initiations of the seismic source for forming a composite seismic-trace signal.

16. The apparatus of claim 15 wherein the means for calculating the respective weighting values calculates the inverse of the sum of the magnitudes of the samples, which comprise the respective composite seismic-trace signals, raised to the selected exponent.

17. The apparatus of claim 15 wherein the means for applying the respective weighting values to the respective component seismic-trace signals comprises means for applying a weighting value based on a linear interpolation between the weighting value calculated for the previous window, if any, and the weighting value calculated for the current window.

18. The apparatus of claim 15, further comprising means for normalizing the composite seismic-trace signal based on the sum of the weighting values for the seismic-trace signal samples.

19. The apparatus of claim 15, further comprising means for recording the composite seismic-trace signal.

20. A remotely deployed field apparatus for processing incoming seismic-trace signals acquired during seismic prospecting utilizing plural initiations of a seismic source, comprising:

means for selecting an exponent from a group of exponents, including 0, 1, 2, 4 and 8, for improving the signal to noise ratio in incoming seismic trace signals for inverse power weighting the incoming seismic trace signals based on the ratio of the expected level of true earth response seismic signals, which can include reflections refractions or ground roll, and the expected level of ambient noise which can include burst noise;

means for dividing each incoming seismic-trace signal into a series of component seismic-trace signals each within a time window of a predetermined length, each component seismic-trace signal comprised of samples of the incoming seismic-trace signal;

means for calculating a respective weighting value for each respective component seismic-trace signal based on the selected exponent by raising the magnitude of each sample of the respective component seismic-trace signal to the selected exponent and next performing a summation and then taking the inverse of the result;

means for applying the respective weighting values to the respective component seismic-trace signals; and means for summing the corresponding weighted component seismic-trace signals from plural initiations of the seismic source for forming a composite seismic-trace signal.

21. The apparatus of claim 20 wherein the means for applying the respective weighting values to the respective component seismic-trace signals comprises means for applying a weighting value based on a linear interpolation between the weighting value calculated for the previous window, if any, and the weighting value calculated for the current window.

22. The apparatus of claim 20, further comprising means for normalizing the composite seismic-trace signal based on the sum of the weighting values for the seismic-trace signal samples.

23. The apparatus of claim 20, further comprising means for recording the composite seismic-trace signal.

* * * * *

UNITED STATES PATENT OFFICE
CERTIFICATE OF CORRECTION

PATENT NO. : 4,561,075

DATED : December 24, 1985

INVENTOR(S) : James W. Smith, et al.

It is certified that error appears in the above-identified patent and that said Letters Patent are hereby corrected as shown below:

Column 3, line 37, "of", first occurrence, should read -- or --.

Column 6, line 68, "powder" should read --power--.

Column 8, line 62 "data" should read --date--.

Column 9, line 26, "windows" should read --window--;

line 43, "taken" should read --take--.

Column 10, line 68, "ration" should read --ratio--.

Column 23, lines 22-23, "among exponents 0, 1, 2, 4 and 8" should read --Fig. 1C--.

Column 24, lines 4-5, "among exponents 0, 1, 2, 4 and 8" should read --Fig. 1C--.

Signed and Sealed this

Thirteenth Day of October, 1987

Attest:

DONALD J. QUIGG

Attesting Officer

Commissioner of Patents and Trademarks